(12) United States Patent
Kobayashi et al.

(10) Patent No.: US 6,510,063 B2
(45) Date of Patent: Jan. 21, 2003

(54) ELECTRIC POWER CONVERSION OPTIMIZED FOR EFFICIENT HARMONIC ELIMINATION

(75) Inventors: Nobuhiro Kobayashi, Tokyo (JP); Naoki Morishima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/969,041

(22) Filed: Oct. 3, 2001

(65) Prior Publication Data

US 2002/0048181 A1 Apr. 25, 2002

Related U.S. Application Data

(63) Continuation-in-part of application No. 09/707,898, filed on Nov. 8, 2000, now abandoned.

(30) Foreign Application Priority Data

May 30, 2000 (JP) .................................. 2000-160872

(51) Int. Cl.[7] .............................................. H02M 1/12
(52) U.S. Cl. ........................... 363/41; 363/71; 363/137
(58) Field of Search ............................. 363/39, 40, 41, 363/65, 71, 135, 136, 137

(56) References Cited

U.S. PATENT DOCUMENTS

| 3,781,635 A | * | 12/1973 | Saver |
| 3,876,923 A | | 4/1975 | Humphrey et al. |
| 3,943,429 A | * | 3/1976 | Heintze |
| 3,979,662 A | | 9/1976 | Klein |
| 4,204,264 A | | 5/1980 | Lipman |
| 4,549,258 A | * | 10/1985 | Honbu et al. .................. 363/71 |
| 4,802,079 A | * | 1/1989 | Mizoguchi .................... 363/41 |
| 4,849,870 A | | 7/1989 | Heinrich |
| 4,975,822 A | * | 12/1990 | Lipman ....................... 363/40 |
| 5,016,158 A | | 5/1991 | Matsui et al. |
| 5,047,909 A | | 9/1991 | Hosoda |
| 5,168,437 A | | 12/1992 | Gyugyi et al. |
| 5,198,971 A | | 3/1993 | Recker et al. |
| 5,337,227 A | | 8/1994 | Stacey et al. |
| 5,434,771 A | | 7/1995 | Danby et al. |
| 5,515,264 A | | 5/1996 | Stacey |
| 5,933,339 A | | 8/1999 | Duba et al. |

OTHER PUBLICATIONS

Patel et al.; "Generalized Techniques of Harmonic Elimination and Voltage Control in Thyristor Inverters: Part I—Harmonic Elimination", *IEEE Transactions on Industry Applications*, vol. 1A–9, No. 3, May/Jun. 1973, pp. 310–317.

* cited by examiner

*Primary Examiner*—Jeffrey Sterrett
(74) *Attorney, Agent, or Firm*—Leydig, Voit & Mayer, Ltd.

(57) ABSTRACT

Power conversion units using pulse width modulation for elimination of harmonics of specific orders are connected in parallel with an ac power system so that the power conversion units supply voltages of mutually different waveforms to the ac power system.

4 Claims, 19 Drawing Sheets

AMPLITUDE OF THIRD-ORDER HARMONIC OF POWER CONVERSION UNIT 14

AMPLITUDE OF THIRD-ORDER HARMONIC OF POWER CONVERSION UNIT 15

AMPLITUDE OF THIRD HARMONIC OF DUAL-SYSTEM
POWER CONVERSION APPARATUS ACCORDING TO
FIRST EMBODIMENT

NUMERAL TABLE

NUMERAL TABLE
$\alpha_{21}(k) \sim \alpha_{25}(k)$ (DEGREES)

NUMERAL TABLE
$\alpha_{31}(k) \sim \alpha_{35}(k)$ (DEGREES)

AMPLITUDE OF THIRD HARMONIC OF TRIPLE-SYSTEM POWER CONVERSION APPARATUS ACCORDING TO SECOND EMBODIMENT

AMPLITUDE OF NINTH HARMONIC OF DUAL-SYSTEM POWER CONVERSION APPARATUS ACCORDING TO FIRST EMBODIMENT

AMPLITUDE OF NINTH HARMONIC OF TRIPLE-SYSTEM POWER CONVERSION APPARATUS ACCORDING TO SECOND EMBODIMENT

NUMERAL TABLE

AMPLITUDE OF THIRD HARMONIC OF POWER CONVERSION UNIT 3

ELECTRIC POWER CONVERSION OPTIMIZED FOR EFFICIENT HARMONIC ELIMINATION

RELATED APPLICATION

This disclosure is a continuation-in-part of U.S. patent application Ser. 09/707,898, filed Nov. 8, 2000 now abandoned.

BACKGROUND OF THE INVENTION

1. Field of the Invention

The present invention generally relates to methods and apparatuses for electric power conversion and, more particularly, to a method and an apparatus for electric power conversion operating between a dc power system and an ac power system optimized for efficient harmonic elimination.

2. Description of the Related Art

FIG. 20 shows a construction of a related-art electric power conversion apparatus shown in *Generalized Techniques of Harmonic Elimination and Voltage Control in Thyristor Inverters: Part I—Harmonic Elimination, IEEE Transactions On Industry Applications,* Vol. IA-9, No. 3, May/June 1973. Referring to FIG. 20, the electric power conversion apparatus comprises a dc power system, a three-phase (u phase, v phase, w phase) ac power system 2, a power conversion unit 3 for dc to ac power conversion based on pulse width modulation for elimination of harmonics of specific orders and a codulating circuit 4 for controlling an output voltage of the power conversion unit 3. The power conversion unit 3 utilizes switching elements such as gate turn-off thyristors.

FIGS. 21A, 21B and 21C are graphs showing waveforms $V_{ou}$, $V_{ov}$ and $V_{ow}$ of the u-phase voltage, v-phase voltage and w-phase voltage, respectively, output from the power conversion unit 3. $V_{su}$, $V_{sv}$ and $V_s$ each represents a sinusoidal waveform of the fundamental of the output voltage for each phase. The waveforms $V_{su}$, $V_{sv}$ and $V_{sw}$ are mathematically represented as $$V_{su} = k \cdot E_{dc} \cdot \sin \theta \quad (1)$$

$$V_{sv} = k \cdot E_{dc} \cdot \sin(\theta - 120°) \quad (2)$$

$$V_{sv} = k \cdot E_{dc} \cdot \sin(\theta + 120°) \quad (3)$$

where k indicates an instruction (control setting) for an amplitude of voltage of a fundamental, θ indicates an instruction (control setting) for a phase of a voltage of a fundamental and $E_{dc}$ indicates a dc voltage level.

FIG. 22 is a numeral chart referred to in order to determine variables $\alpha_1$, $\alpha_2$, $\alpha_3$, $\alpha_4$ and $\alpha_5$ that define the sinusoidal waveforms $V_{su}$, $V_{sv}$ and $V_{sw}$. Instructions k input to the modulating circuit 4 are plotted horizontally in the chart. Each of the variables $\alpha_1$–$\alpha_5$ varies in a range of 0 to 90 degrees and is plotted vertically in the chart. For each given instruction k, a set of variables $\alpha_1$, $\alpha_2$, $\alpha_3$, $\alpha_4$ and $\alpha_5$ are determined.

FIG. 23 is a graph showing an amplitude of a third harmonic included in a waveform of a voltage for one phase produced by the electric power conversion apparatus.

A description will now be given of the operation according to the related art. Responsive to an input of a fundamental voltage amplitude instruction k and a fundamental voltage phase instruction θ, the modulating circuit 4 outputs an operation signal r for ensuring that the fundamental components of the voltages for the respective phases output from the power conversion unit 3 have respective waveforms $V_{su}$, $V_{sv}$ and $V_{sw}$. In other words, the modulating circuit outputs the operation signal r that causes the power conversion unit 3 to output the waveforms $V_{ou}$, $V_{ov}$ and $V_{ow}$.

In response to the operation signal r from the modulating circuit 4, the power conversion unit 3 effects power conversion between the dc power system 1 and the ac power system 2, by driving the switching elements so that the u-phase output voltage, the v-phase output voltage and the w-phase output voltage have the waveforms $V_{ou}$, $V_{ov}$ and $V_{ow}$, respectively.

As shown in FIGS. 21A, 21B and 21C, the voltage waveforms $V_{ou}$, $V_{ov}$ and $V_{ow}$ are determined by the variables $\alpha_1$–$\alpha_5$. The variable $\alpha_1$–$\alpha_5$ are uniquely determined by the fundamental voltage amplitude instruction k. More specifically, the variables $\alpha_1$–$\alpha_5$ are determined by the modulating circuit 4 by referring to a numeral table of FIG. 22.

Each of the voltage waveforms $V_{ou}$, $V_{ov}$ and $V_{ow}$ comprises five pulses symmetrical about the horizontal axis. The fundamental components of the voltage waveforms $V_{ou}$, $V_{ov}$ and $V_{ow}$ have the waveforms $V_{su}$, $V_{sv}$ and $V_{sw}$. The amplitude of fifth, seventh, eleventh and thirteenth harmonics is zero.

With this operation, it is ensured that the fifth, seventh, eleventh and thirteenth harmonics are eliminated from the voltage output from the power conversion unit 3. The power conversion unit 3 outputs fundamental components having a predetermined amplitude. When the output voltages are in a three-phase balanced state, the line-to-line voltage cancels harmonics that are multiples of three so that these harmonics are not included in the output voltages.

As described above, the related-art power conversion apparatus is constructed such that harmonics that are multiples of three are cancelled by the line-to-line voltage and eliminated from the output voltages, when the output voltages of the power conversion unit 3 are in a three-phase balanced state. When imbalance of the output voltages of the power conversion unit 3 occurs, harmonics that are multiples of three are included in the output voltages.

More specifically, when imbalance of the output voltages of the power conversion unit 3 occurs (for example, when the output voltages of the respective phases have mutually different fundamental components so that the fundamental components have different phases), the magnitude of harmonics of multiples of three, included in the output voltage, differ from phase to phase. Consequently, harmonics of multiples of three cannot be canceled by the line-to-line voltage and are included in the output voltages.

In order to eliminate harmonics such as third harmonics or ninth harmonics, it is conceivable to use a plurality of power conversion units that employ the pulse width modulation method for eliminating harmonics of specific orders.

However, when a plurality of power conversion units are connected in parallel such that the phases of the fundamental components thereof are displaced from each other by an appropriate magnitude, using multiple reactors for connection, a cross current having a fundamental frequency may flow between the plurality of power conversion units. When a plurality of power conversion units are connected in series such that the phases of the fundamental components thereof are displaced from each other, the upper limit of the voltage of the fundamental that can be output is reduced.

SUMMARY OF THE INVENTION

Accordingly, an object of the present invention is to provide an electric power conversion apparatus in which the aforementioned problems are eliminated.

Another and more specific object of the present invention is to provide an electric power conversion apparatus capable of suppressing harmonics including third harmonics and ninth harmonics included in the output voltage even when phase-to-phase imbalance of the output voltages of a plurality of power conversion units, and without inducing a cross current having the frequency of a fundamental between the plurality of power conversion units.

The aforementioned objects can be achieved by a power conversion apparatus using a power conversion unit to effect power conversion between a dc power system and an ac power system, comprising: a plurality of power conversion units using a pulse width modulation method adapted for elimination of harmonics of specific orders and connected to the ac power system, wherein the plurality of power conversion units supply voltages of mutually different waveforms to the ac power system.

The plurality of power conversion units may be connected in parallel with the ac power system via reactors.

Two power conversion units may be connected in parallel.

Three power conversion units may be connected in parallel.

The aforementioned objects can also be achieved by a method of converting electric power between a dc power system and an ac power system, comprising the steps of: supplying instructions to a plurality of power conversion units each using a pulse width modulation method adapted for elimination of harmonics of specific orders and connected to the ac power system; supplying from the plurality of power conversion units voltages of mutually different waveforms to the ac power system.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
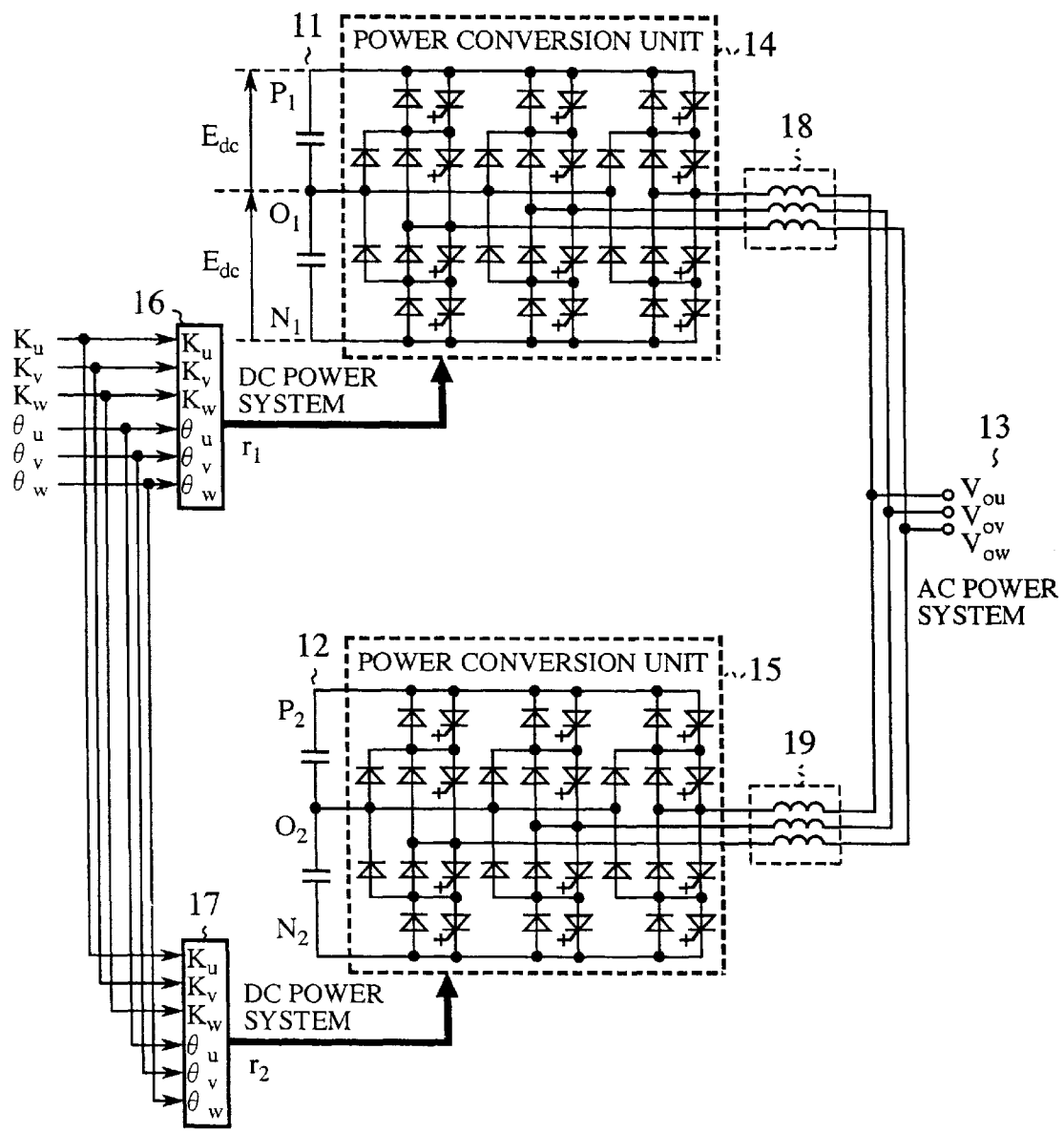
FIG. 1 is a schematic diagram showing an electric power conversion apparatus according to a first embodiment of the present invention.

FIG. 1 is a schematic diagram showing an electric power conversion apparatus according to a first embodiment of the present invention.

Generally, a total of (n1+n2+n3+ . . . +nq) power conversion units adapted to output voltage waveforms Px (x=1, 2, . . . q) not including m1, m2, . . . mr harmonic components are used to construct the power conversion apparatus. In the example of FIG. 1, r=4, m1=5, m2=7, m3=11, m4=13, q=2, n1=1 and n2=1. The voltage waveform Px comprises five pulses symmetrical about the horizontal axis. The power conversion apparatus uses three-phase, three-level, five-pulse inverters respectively adapted to cancel fifth, seventh, eleventh and thirteenth harmonics included in the output voltage comprising the five pulses. In the case of FIG. 1, the power conversion apparatus is formed as a dual-system power conversion apparatus.

Referring to FIG. 1, the power conversion apparatus comprises a dc power system in which a $P_1$-$O_1$ voltage and a $O_1$-$N_1$ voltage are equal to $E_{dc}$, a dc power system 12 in which a $P_2$-$O_2$ voltage and a $O_2$-$N_2$ voltage are equal to $E_{dc}$, a three-phase (u-phase, v-phase, w-phase) ac power system 13, power conversion units 14 and 15 for dc to ac power conversion based on the pulse width modulation adapted for elimination of harmonics of specific orders, using switching elements such as GTOs. The power conversion apparatus further comprises modulating circuits 16 and 17 receiving a u-phase fundamental voltage amplitude instruction $k_u$, a v-phase fundamental voltage amplitude instruction $k_v$, and a w-phase fundamental voltage amplitude instruction $k_w$ and outputting operation signals r1 and r2, which controls the output voltage of the power conversion units 14 and 15, in response to a u-phase fundamental voltage phase instruction $\theta_u$, a v-phase fundamental voltage phase instruction $\theta_v$ and a w-phase fundamental voltage phase instruction $\theta_w$, and reactors 18 and 19 connecting in parallel the power conversion units 14 and 15, respectively, to the ac power system 13.

While the illustrated construction uses the reactors 18 and 19 to connect the power conversion units 14 and 15 to the ac power system 13, a transformer may also be used to connect the power conversion units 14 and 15 to the ac power system 13. Alternatively, the power conversion units 14 and 15 may be connected in series with the ac power system 13 instead of in parallel.

Figure 2:
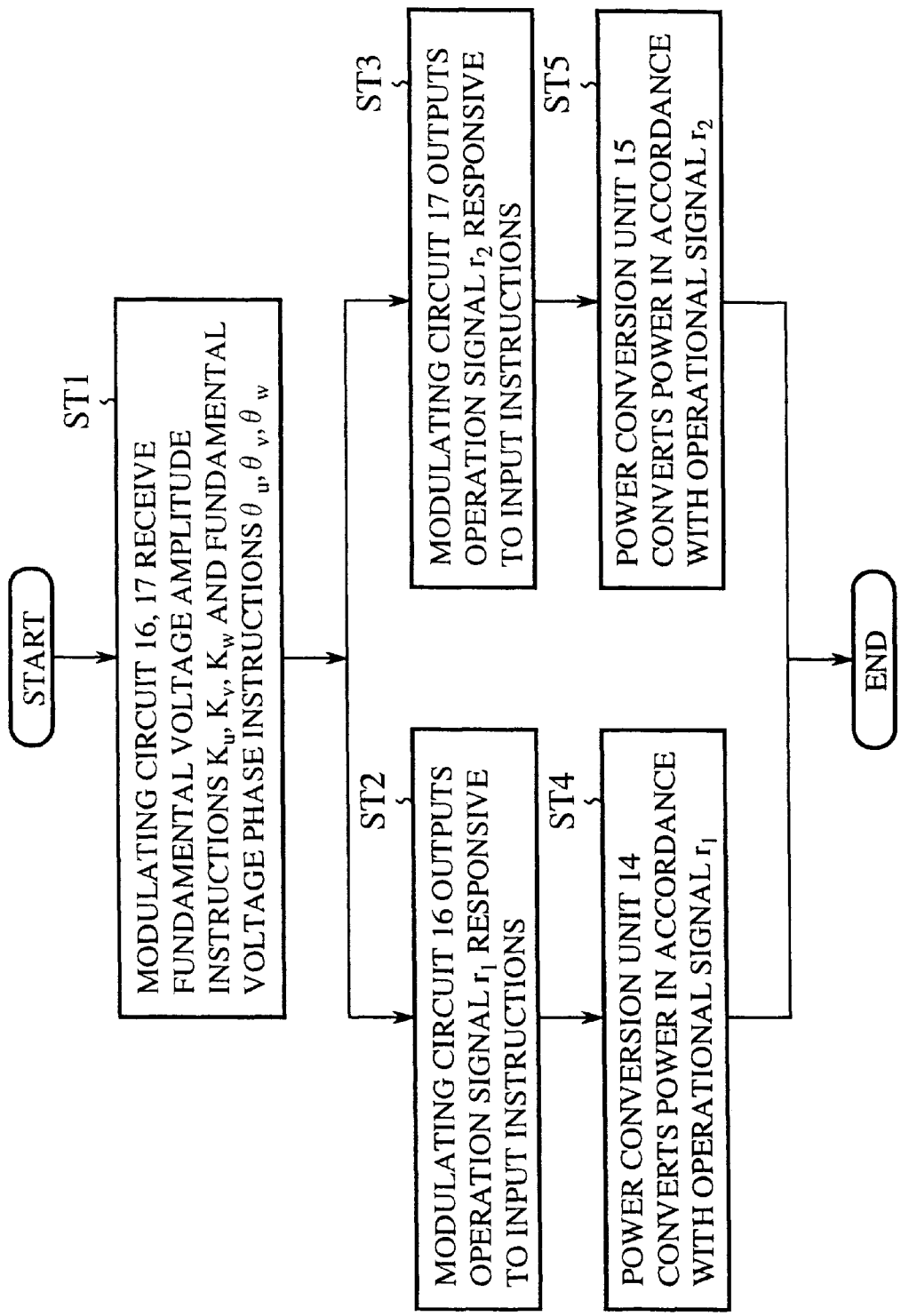
FIG. 2 is a flowchart showing processes performed by the electric power conversion apparatus according to the first embodiment.

FIG. 2 is a flowchart showing processes performed by the electric power conversion apparatus according to the first embodiment.

Figure 3A:
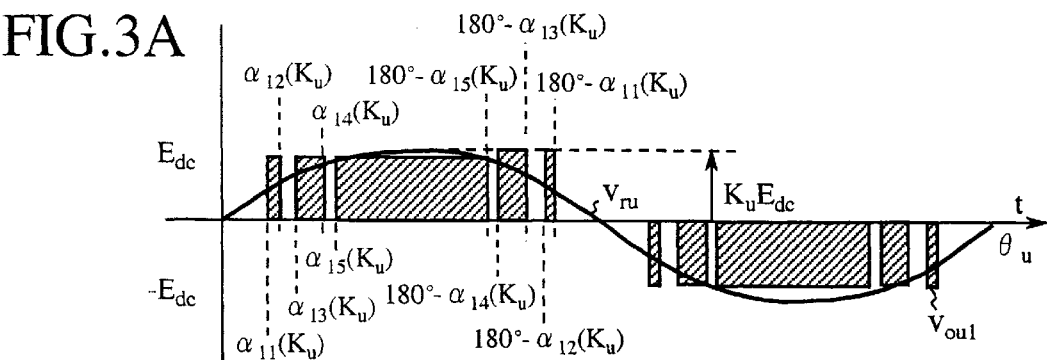
FIGS. 3A through 3C are graphs showing waveforms of voltages output by a power conversion unit 14.
Figure 3B:
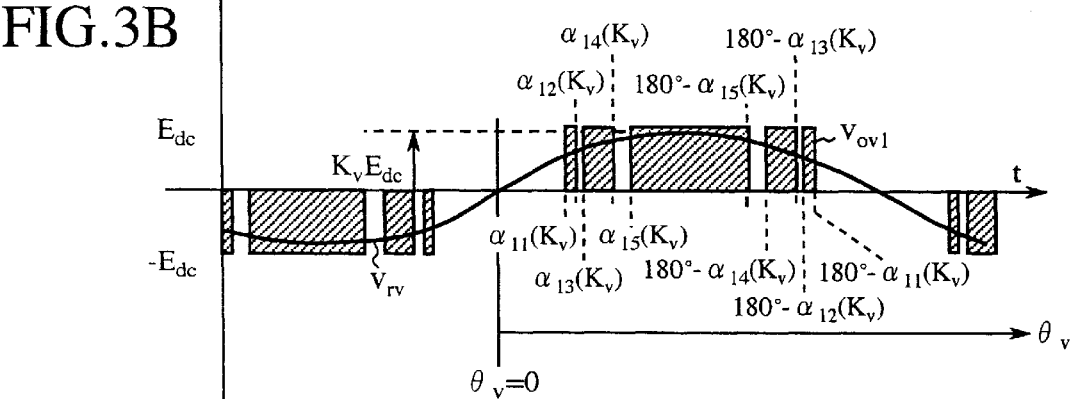
Figure 3C:
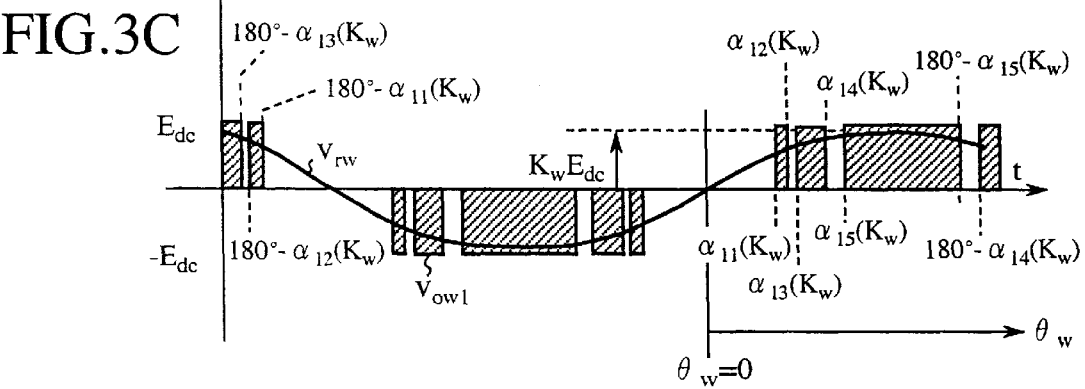

FIGS. 3A, 3B and 3C are graphs showing waveforms $V_{ou1}$, $V_{ov1}$ and $V_{ow1}$ of the u-phase voltage, v-phase voltage and w-phase voltage, respectively, output from the power conversion unit 14. $V_{ru}$, $V_{rv}$ and $V_{rw}$ each represents a sinusoidal waveform of the fundamental of the output voltage for each phase. The waveforms $V_{ru}$, $V_{rv}$ and $V_{rw}$ and mathematically represented as $$V_{ru}=k_u \cdot E_{dc} \cdot \sin \theta_u \quad (4)$$

$$V_{rv}=k_v \cdot E_{dc} \cdot \sin(\theta_v-120°) \quad (5)$$

$$V_{rw}=k_w \cdot E_{dc} \cdot \sin(\theta_w+120°) \quad (6)$$

where $k_u$, $k_v$ and $k_w$ indicate instructions (control setting) for an amplitude of voltage of a fundamental, $\theta_u$, $\theta_v$ and $\theta_w$ each indicates an instruction (control setting) for a phase of a voltage of a fundamental.

Figure 4:
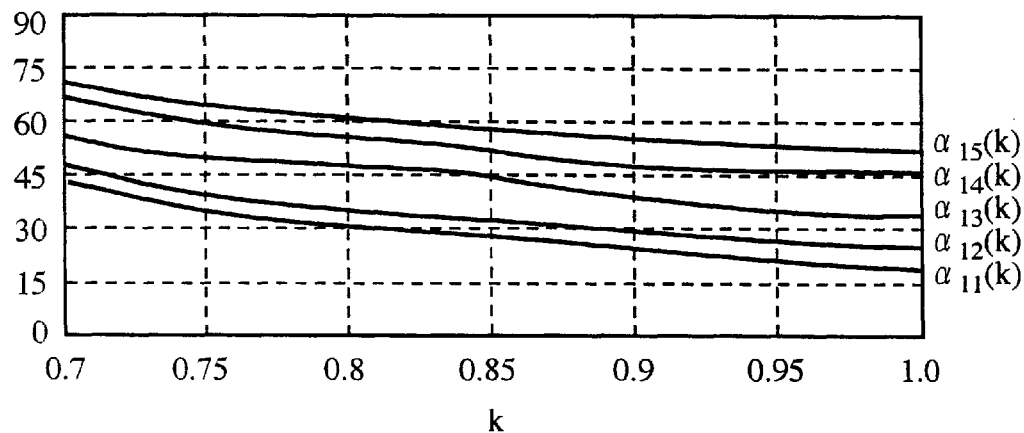
FIG. 4 shows a numeral table used to determine variables $\alpha_{11}$, $\alpha_{12}$, $\alpha_{13}$, $\alpha_{14}$ and $\alpha_{15}$ that define sinusoidal waveforms $V_{ru}$, $V_{rv}$ and $V_{rw}$.

FIG. 4 shows a numeral table used to determine variables $\alpha_{11}$, $\alpha_{12}$, $\alpha_{13}$, $\alpha_{14}$ and $\alpha_{15}$ that define sinusoidal waveforms $V_{ru}$, $V_{ru}$ and $V_{rw}$. Instructions $k_u$, $k_v$ and $k_w$ input to the modulating circuit 16 are plotted horizontally in the chart. Each of the variables $\alpha_{11}$–$\alpha_{15}$ varies in a range of 0 to 90 degrees and is plotted vertically in the chart. For each of the given instructions $k_u$, $k_v$ and $k_w$, a set of variables $\alpha_{11}$, $\alpha_{12}$, $\alpha_{13}$, $\alpha_{14}$ and $\alpha_{15}$ are determined.

Figure 5A:
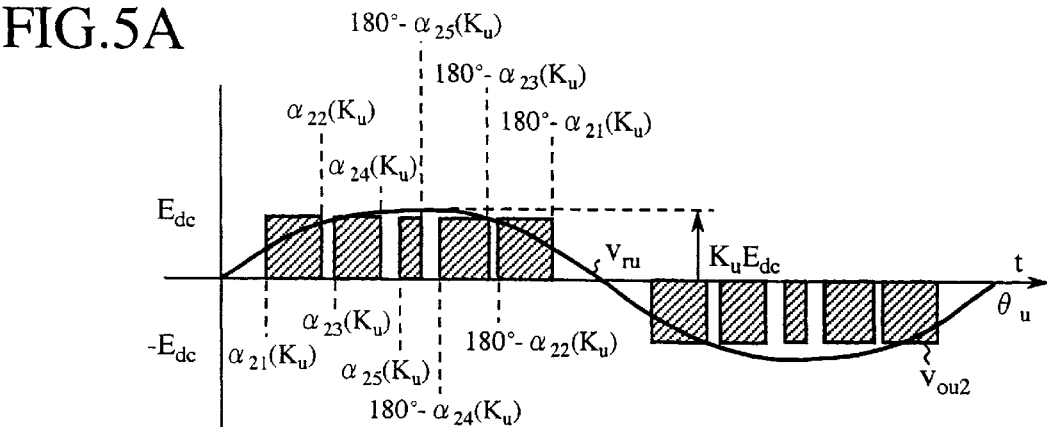
FIGS. 5A through 5C are graphs showing waveforms of voltages output by a power conversion unit 15.
Figure 5B:
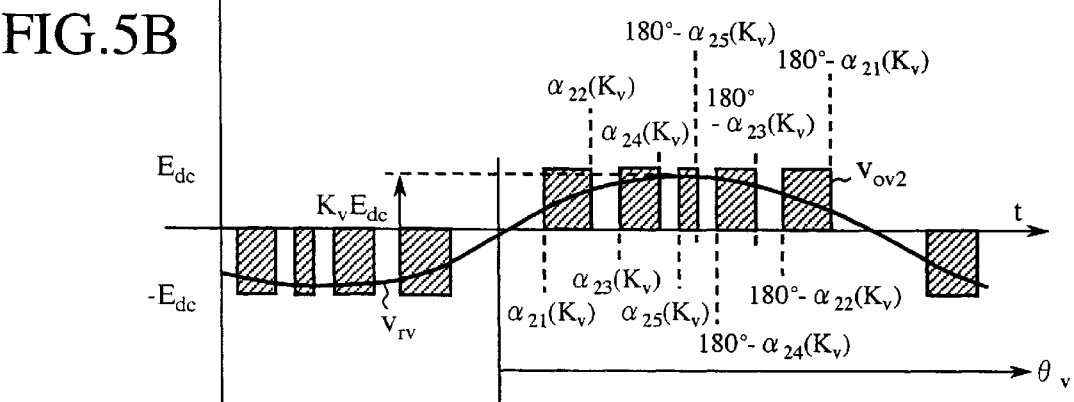
Figure 5C:
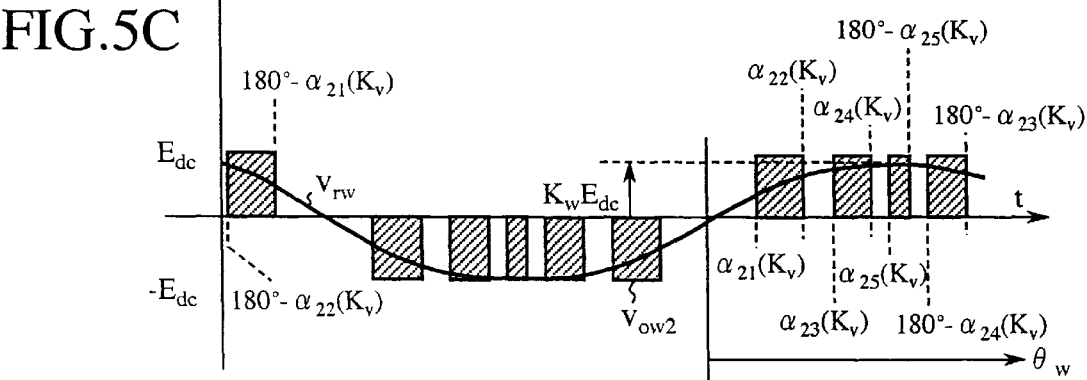

FIGS. 5A, 5B and 5C are graphs showing waveforms $V_{ou2}$, $V_{ov2}$ and $V_{ow2}$ output from the power conversion unit 15. $V_{ru}$, $V_{rv}$ and $V_{rw}$ each represents a sinusoidal waveform of the fundamental of the output voltage for each phase. The waveforms $V_{ru}$, $V_{rv}$ and $V_{rw}$ are mathematically represented as the equations (4), (5) and (6) above.

Figure 6:
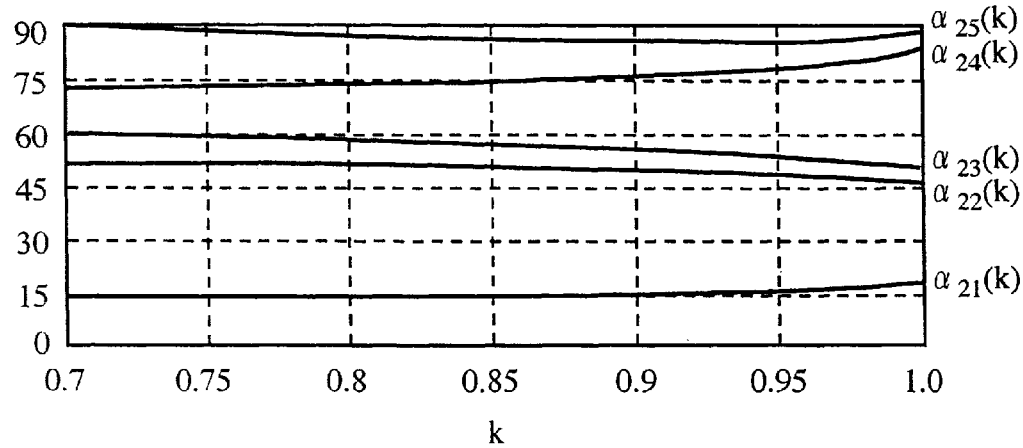
FIG. 6 shows a numeral table used to determine variables $\alpha_{21}$, $\alpha_{32}$, $\alpha_{23}$, $\alpha_{24}$ and $\alpha_{25}$ that define sinusoidal waveforms $V_{ru}$, $V_{rv}$ and $V_{rw}$.

FIG. 6 shows a numeral table used to determine variables $\alpha_{21}$, $\alpha_{32}$, $\alpha_{23}$, $\alpha_{24}$ and $\alpha_{25}$ that define sinusoidal waveforms $V_{ru}$, $V_{ru}$ and $V_{rw}$. Instructions $k_u$, $k_v$ and $k_w$ (generally represented as k) input to the modulating circuit 17 are plotted horizontally in the chart. Each of the variables $\alpha_{21}$–$\alpha_{25}$ varies in a range of 0 to 90 degrees and is plotted vertically in the chart. For each of the given instructions $k_u$, $k_v$ and $k_w$, a set of variables $\alpha_{21}$, $\alpha_{22}$, $\alpha_{23}$, $\alpha_{24}$ and $_{25}$ are determined.

Figure 7:
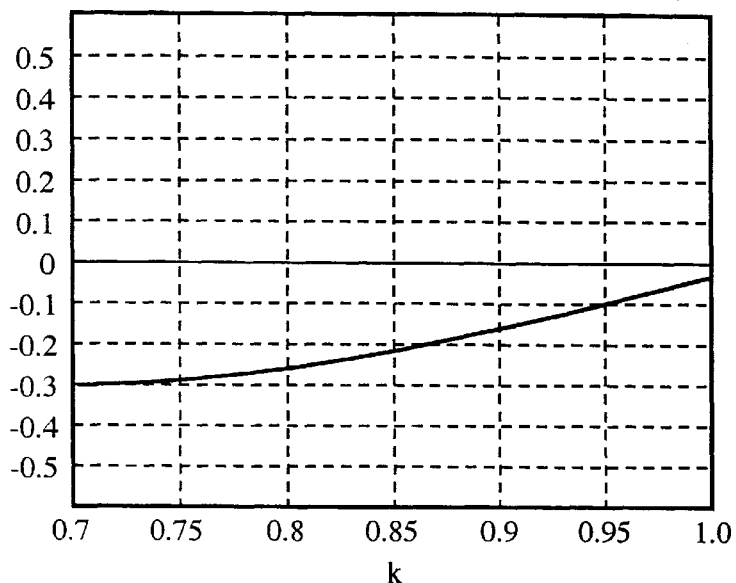
FIG. 7 is a graph showing an amplitude of a third harmonic included in a waveform of a voltage for one phase produced by the electric power conversion unit 14.

FIG. 7 is a graph showing an amplitude of third harmonic included in a waveform of a voltage for a phase produced by the electric power conversion unit 14. Instructions $k_u$, $k_v$ and $k_w$ input to the modulating circuit 16 are plotted horizontally in the graph. A relative amplitude of third harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$=1 is equal to 1.

Figure 8:
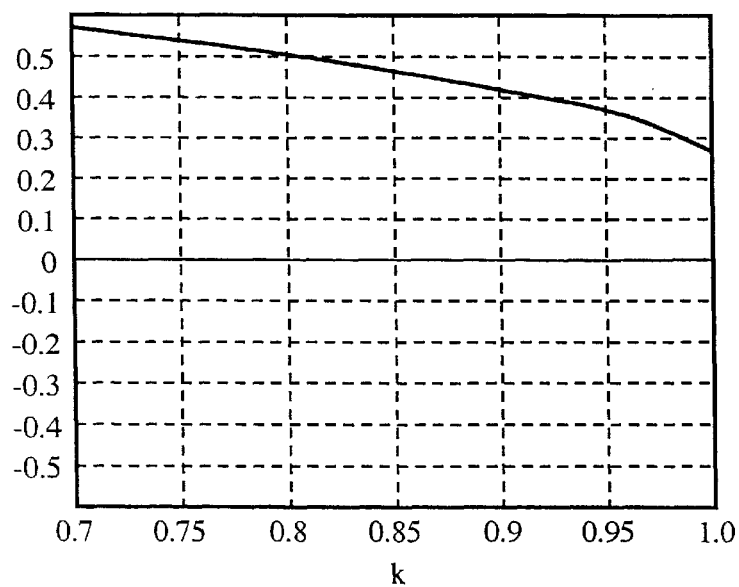
FIG. 8 is a graph showing an amplitude of a third harmonic included in a waveform of a voltage for one phase produced by the electric power conversion unit 15.

FIG. 8 is a graph showing an amplitude of third harmonic included in a waveform of a voltage for a phase produced by the electric power conversion unit 15. Instructions $k_u$, $k_v$ and $k_w$ input to the modulating circuit 17 are plotted horizontally in the graph. A relative amplitude of third harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$=1 is equal to 1.

Figure 9:
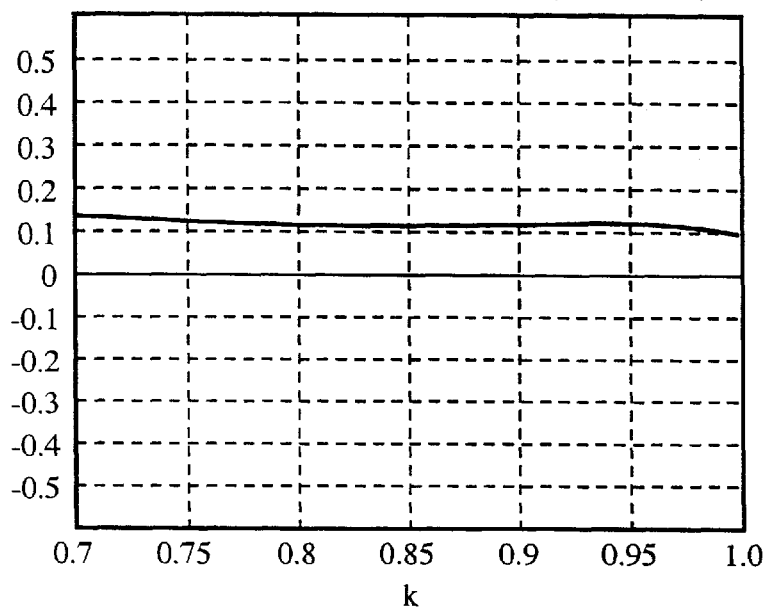
FIG. 9 is a graph showing an amplitude of a third harmonic included in a waveform of a voltage for one phase produced by a dual-system power conversion apparatus according to the first embodiment.

FIG. 9 is a graph showing an amplitude of third harmonic included in a waveform of a voltage for a phase produced by a dual-system power conversion apparatus according to the first embodiment. Instructions $k_u$, $k_v$ and $k_w$ input to the modulating circuits 16 and 17 are plotted horizontally in the graph. A relative amplitude of third harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$=1 is equal to 1.

A description will now be given of the operation according to the first embodiment.

When the modulating circuit 16 receives the fundamental voltage amplitude instructions $k_u$, $k_v$, $k_w$ and the fundamental voltage phase instructions, $\theta_u$, $\theta_v$ and $\theta_w$ (step ST1), the modulating circuit 16 outputs an operation signal r1 for ensuring that the fundamental components of the voltages for the respective phases output from the power conversion unit 14 have the respective waveforms $V_{ru}$, $V_{rv}$ and $V_{rw}$. In other words, the modulating circuit 16 outputs the operation signal r1 that causes the power conversion unit 14 to output the waveforms $V_{ou1}$, $V_{ov1}$ and $V_{ow1}$ (step ST2).

When the modulating circuit 17 receives the fundamental voltage amplitude instructions $k_u$, $k_v$, $k_w$ and the fundamental voltage phase instructions $\theta_u$, $\theta_v$ and $\theta_w$ (step ST1), the modulating circuit 17 outputs an operation signal r2 for ensuring that the fundamental components of the voltages for the respective phases output from the power conversion unit 15 have the respective waveforms $V_{ru}$, $V_{rv}$ and $V_{rw}$. In other words, the modulating circuit 17 outputs the operation signal r2 that causes the power conversion unit 15 to output the waveforms $V_{ou2}$, $V_{ov2}$ and $V_{ow2}$ (step ST3).

In response to the operation signal r1 from the modulating circuit 16, the power conversion unit 14 effects power conversion between the dc power system 11 and the ac power system 13, by driving the switching elements so that the u-phase output voltage, the v-phase output voltage and the w-phase output voltage have the waveforms $V_{ou1}$, $V_{ov1}$ and $V_{ow1}$, respectively (step ST4).

In response to the operation signal r2 from the modulating circuit 17, the power conversion unit 15 effects power conversion between the dc power system 12 and the ac power system 13, by driving the switching elements so that the u-phase output voltage, the v-phase output voltage and the w-phase output voltage have the waveforms $V_{ou2}$, $V_{ov2}$ and $V_{ow2}$, respectively (step ST5).

As shown in FIGS. 3A, 3B and 3C, the voltage waveforms $V_{ou1}$, $V_{ov1}$ and $V_{ow1}$ are determined by the variables $\alpha_{11}$–$\alpha_{15}$. The variables $\alpha_{11}$–$\alpha_{15}$ are uniquely determined by the fundamental voltage amplitude instructions $k_u$, $k_v$, $k_w$. More specifically, the variables $\alpha_{11}$–$\alpha_{15}$ are determined by the modulating circuit 17 by referring to the numeral table of FIG. 4.

Each of the voltage waveforms $V_{ou1}$, $V_{ov1}$ and $V_{ow1}$ comprises five pulses symmetrical about the horizontal axis. The fundamental components of the voltage waveforms $V_{ou1}$, $V_{ov1}$ and $V_{ow1}$ have the waveforms $V_{ru}$, $V_{rv}$ and $V_{rw}$. The amplitude of fifth, seventh, eleventh and thirteenth harmonics is zero.

As shown in FIGS. 5A, 5B and 5C, the voltage waveforms $V_{ou2}$, $V_{ov2}$ and $V_{ow2}$ are determined by the variables $\alpha_{21}$–$\alpha_{25}$. The variables $\alpha_{21}$–$\alpha_{25}$ are uniquely determined by the fundamental voltage amplitude instructions $k_u$, $k_v$, $k_w$. More specifically, the variables $\alpha_{11}$–$\alpha_{15}$ are determined by the modulating circuit 17 by referring to the numeral table of FIG. 6.

Each of the voltage waveforms $V_{ou2}$, $V_{ov2}$ and $V_{ow2}$ comprises five pulses symmetrical about the horizontal axis. The fundamental components of the voltage waveforms $V_{ou2}$, $V_{ov2}$ and $V_{ow2}$ have the waveforms $V_{ru}$, $V_{rv}$ and $V_{rw}$. The amplitude of fifth, seventh, eleventh and thirteenth harmonics is zero.

With this operation, it is ensured that the fifth, seventh, eleventh and thirteenth harmonics are eliminated from the voltage output from the power conversion units 14 and 15. The power conversion units 14 and 15 output fundamental components having a predetermined amplitude.

The output voltage of the dual-system power conversion apparatus of FIG. 1 is an average of the output voltage of the power conversion unit 14 and the output voltage of the power conversion unit 15. The fifth, seventh, eleventh and thirteenth harmonics are eliminated from the voltage output from the dual-system power conversion apparatus of FIG. 1. Thus, the power conversion apparatus of FIG. 1 outputs a fundamental component having a predetermined amplitude.

Since the fundamental components of the power conversion units 14 and 15 are identical, a cross current having a frequency of a fundamental is prevented from flowing between the power conversion units 14 and 15.

When the output voltages are in a three-phase balanced state, that is, when the fundamental voltage amplitude instructions $k_u$, $k_v$, $k_w$ of the respective phases are identical, and when the fundamental voltage phase instructions $\theta_u$, $\theta_v$ and $\theta_w$ are displaced 120 degrees from each other, the line-to-line voltage cancels harmonics that are multiples of three so that these harmonics are not included in the output voltages.

When a minor imbalance between the output voltages of the respective phases is produced, the fundamental voltage amplitude instructions $k_u$, $k_v$, $k_w$ may not be identical and the fundamental voltage phase instructions $\theta_u$, $\theta_v$ and $\theta_w$ are displaced from each other by degrees other than 120 degrees.

As shown in FIGS. 7 and 8, in the PWM method in which harmonics of specific orders are eliminated, the amplitude of third harmonic in the output voltage differs depending on the amplitude of fundamental of the output voltage. Accordingly, when a singular power conversion unit employing the PWM method designed to eliminate harmonics of specific orders is used (for example, when only the power conversion unit 14 is used for power conversion or when only the power conversion unit 15 is used for power conversion), third harmonic components may be included by different magnitude in the three phases when the fundamental voltage amplitude instructions $k_u$, $k_v$, $k_w$ are not identical. Consequently, some portion of the third harmonic component included in the output voltage remains in the output voltage without being cancelled by the line-to-line voltage.

In contrast, the output voltage of the dual-system power conversion apparatus of FIG. 1, in which both the power conversion units 14 and 15 are used for power conversion) is an average of the output voltage of the power conversion unit 14 and the output voltage of the power conversion unit 15. Accordingly, the amplitude of third harmonic components included in the output voltages of the respective phases is as shown in FIG. 9.

FIG. 9 shows that the amplitude of third harmonic components included in the output voltages of the respective phases of the dual-system power conversion apparatus is constant irrespective of the amplitude of fundamental components included in the output voltages. As a result, the third harmonic components included in the output voltages of the respective phases have substantially identical amplitude even when there is a minor imbalance between the output voltages of the respective phases of the dual-system power conversion apparatus. The third harmonic component in the output voltage is cancelled assuming that the phase differences between the fundamental components are only slightly different from 120 degrees.

A more detailed description will now be given of the operation of the modulating circuits 16 and 17, by taking an example of the u phase.

Figure 24:
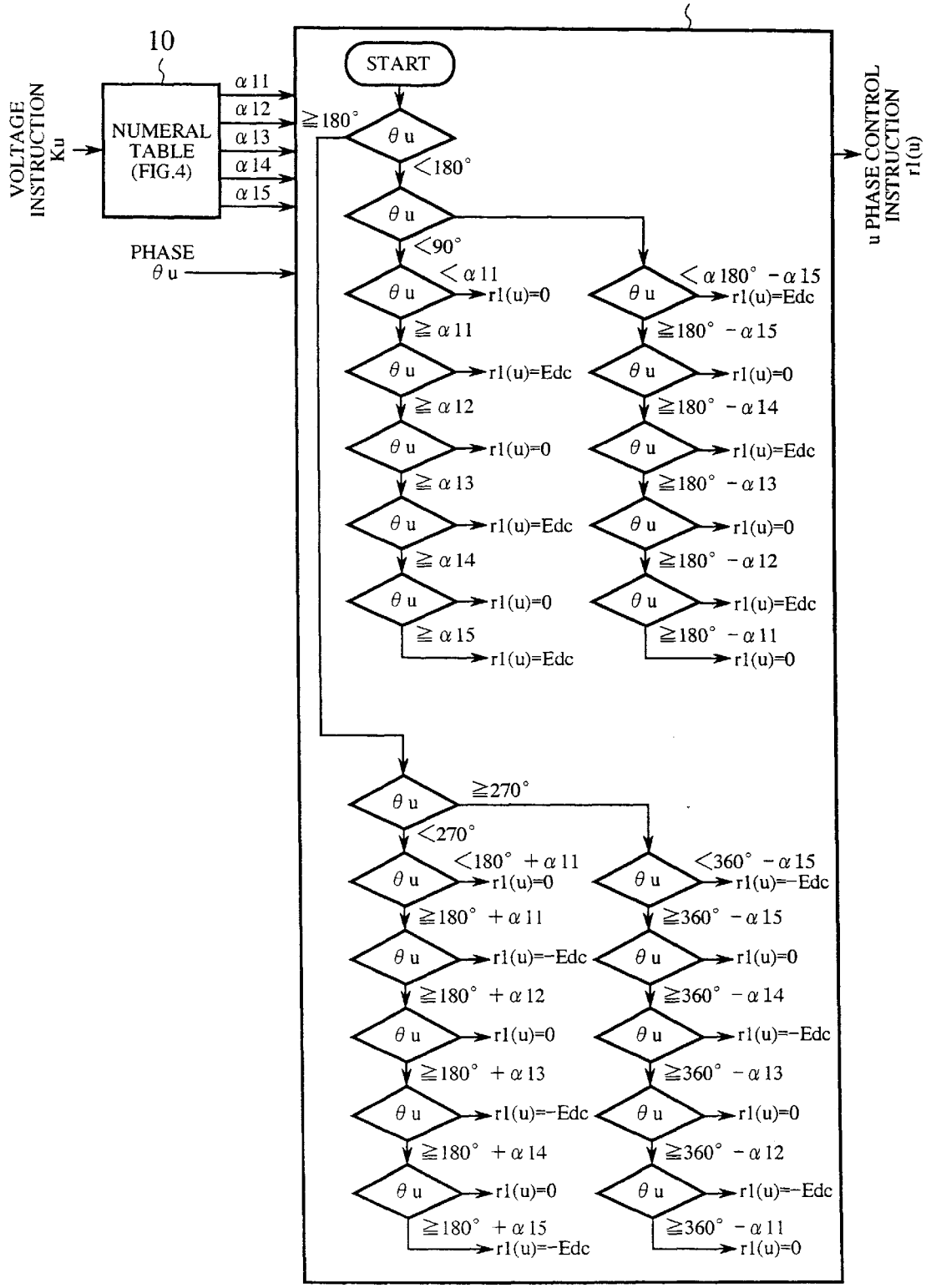
FIG. 24 shows a detailed structure of a modulator for the power conversion apparatus of FIG. 1.

FIG. 24 shows a detailed construction of the modulating circuit 16 of FIG. 1. The modulating circuit 16 comprises a numeral table 40 and an operation instruction unit 41. The numeral table 40 is as shown in FIG. 4 and outputs variables (angles) $\alpha_{11}$, $\alpha_{12}$, $\alpha_{13}$, $\alpha_{14}$, and $\alpha_{15}$, in accordance with the voltage instruction $k_u$. The operation instruction unit 41 compares the phase $\theta_u$ of a target alternate output with the angles $\alpha_{11}$, $\alpha_{12}$, $\alpha_{13}$, $\alpha_{14}$, and $\alpha_{15}$, so as to output a u-phase control signal (instruction) $r_{1(u)}$. The PWM waveform is as shown in FIG. 3. The PWM pattern in the first quarter period (0–90°) is symmetrical with that of the second quarter period. The PWM pattern in the third quarter period is symmetrical with that of the fourth quarter period.

Referring to the operation instruction unit 41 of FIG. 24, a determination is first made as to whether the phase angle $\theta_u$ is smaller than 180°. If it is determined that $\theta_u$ is smaller than 180°, a determination is then made as to whether $\theta_u$ is smaller than 90°. If it is determined that $\theta_u$ is smaller than 90° and also smaller than $\alpha_{11}$, the control signal $r_{1(u)}$ indicating a voltage pattern at 0 level is output. If $\theta_u$ is determined to be equal to or larger than $\alpha_{11}$, but smaller than $\alpha_{12}$, the control signal $r_{1(u)}$ indicating $E_{dc}$ is output. If $\theta_u$ is determined to be equal to or larger than $\alpha_{12}$ but smaller than $\alpha_{13}$, the control signal $r_{1(u)}$ indicating 0 is output. If $\theta_u$ is determined to be equal to or larger than $\alpha_{13}$ but smaller than $\alpha_{14}$, the control signal $r_{1(u)}$ indicating $E_{dc}$ is output. If $\theta_u$ is determined to be equal to or larger than $\alpha_{14}$ but smaller than $\alpha_{15}$, the control signal $r_{1(u)}$ indicating 0 is output. If $\theta_u$ is determined to be equal to or larger than $\alpha_{15}$, the control signal $r_{1(u)}$ indicating $E_{dc}$ is output.

If it is determined that $\theta_u$ is such that $90° \leq \theta_u < 180°$, a determination is then made as to whether $\theta_u$ is smaller than $180° - \alpha_{15}$. If $\theta_u$ is determined to be smaller than $180° - \alpha_{15}$, the control signal $r_{1(u)}$ indicating $E_{dc}$ is output. If $\theta_u$ is determined to be equal to or larger than $180° - \alpha_{15}$ but smaller than $180°-\alpha_{14}$, the control signal $r_{1(u)}$ indicating 0 is output. If $\theta_u$ is determined to be equal to or larger than $180°-\alpha_{14}$ but smaller than $180°-\alpha_{13}$, the control signal $r_{1(u)}$ indicating $E_{dc}$ is output. If $\theta_u$ is determined to be equal to or larger than $180°-\alpha_{12}$ but smaller than $180°-\alpha_{11}$, the control signal $r_{1(u)}$ indicating 0 is output. If $\theta_u$ is determined to be equal to or larger than $180°-\alpha_{12}$, but smaller than $180°-\alpha_{11}$, the control signal $r_{1(u)}$ indicating $E_{dc}$ is output. If $\theta_u$ is determined to be equal to or larger than $180°-\alpha_{11}$, the control signal $r_{1(u)}$ indicating 0 is output.

Similar steps are performed when $180°<\theta_u<360°$ (see the bottom portion of the operation instruction unit 41 of FIG. 24) so that the control signal $r_{1(u)}$ indicating a voltage pattern at either 0 level or $-E_{dc}$ level is output.

Figure 25:
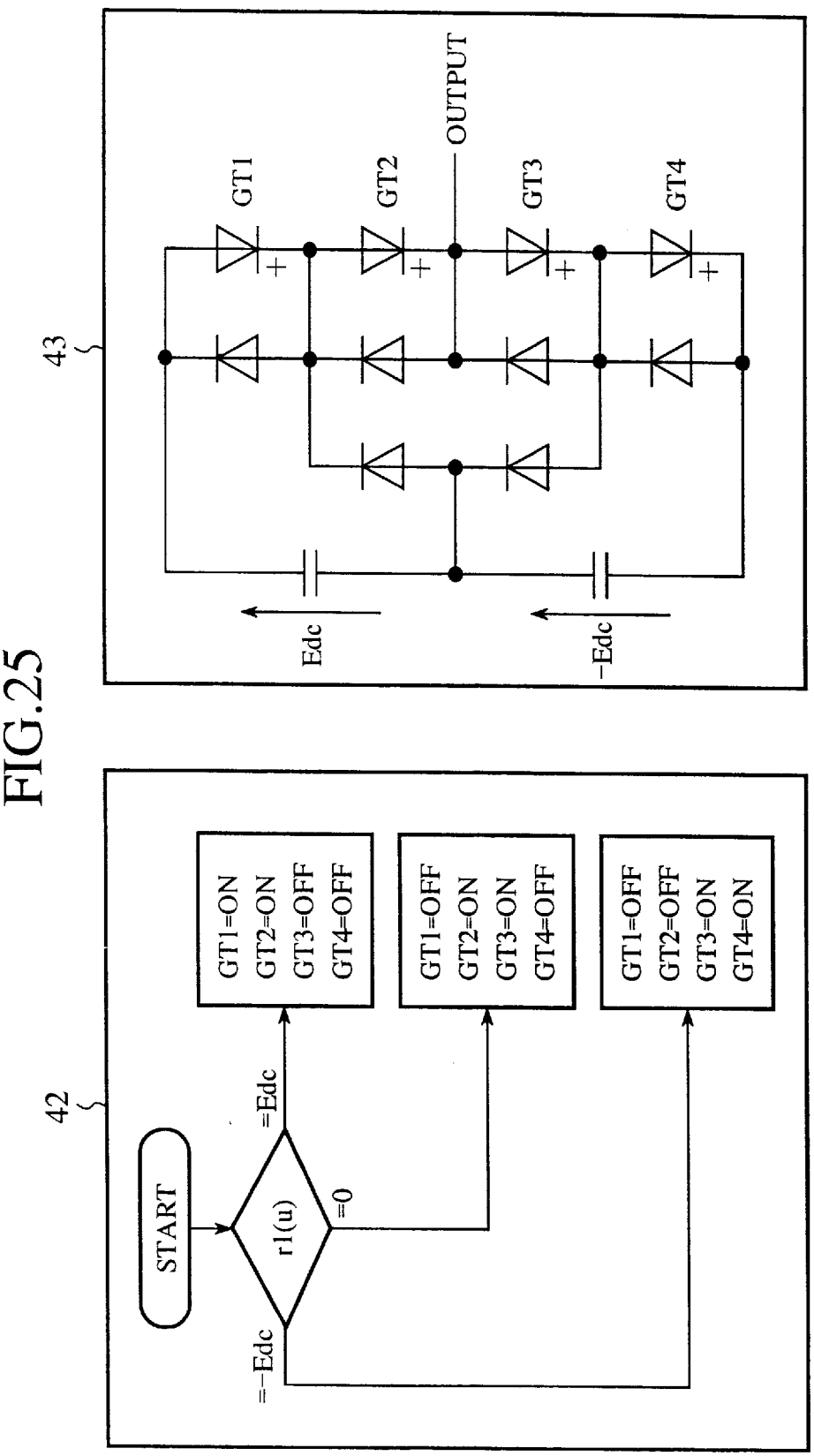
FIG. 25 is a block diagram and electrical schematic illustrating conversion of a control signal.

FIG. 25 shows how the u-phase control signals $r_{1(u)}$ are converted into associated switching signals. Block 42 is a chart illustrating how the conversion takes place and block 43 indicates the switching elements corresponding to the u phase and subject to control by the control signal $r_{1(u)}$. The control signal $r_{1(u)}$ is converted into switching signals for controlling the switching elements GT1, GT2, GT3, and GT4 constituting the power conversion unit 14. When the control signal $r_{1(u)}$ indicates $E_{dc}$, the switching elements GT1 and GT2 are turned on so that a capacitor voltage $E_{dc}$ is output via the output terminal. When the control signal $r_{1(u)}$ indicates 0, the switching elements GT2 and GT3 are turned on so that a 0 voltage is output via the output terminal. When the control signal $r_{1(u)}$ indicates $-E_{dc}$, the switching elements GT3 and GT4 are turned on so that a capacitor voltage $-E_{dc}$ is output via the output terminal.

Figure 26:
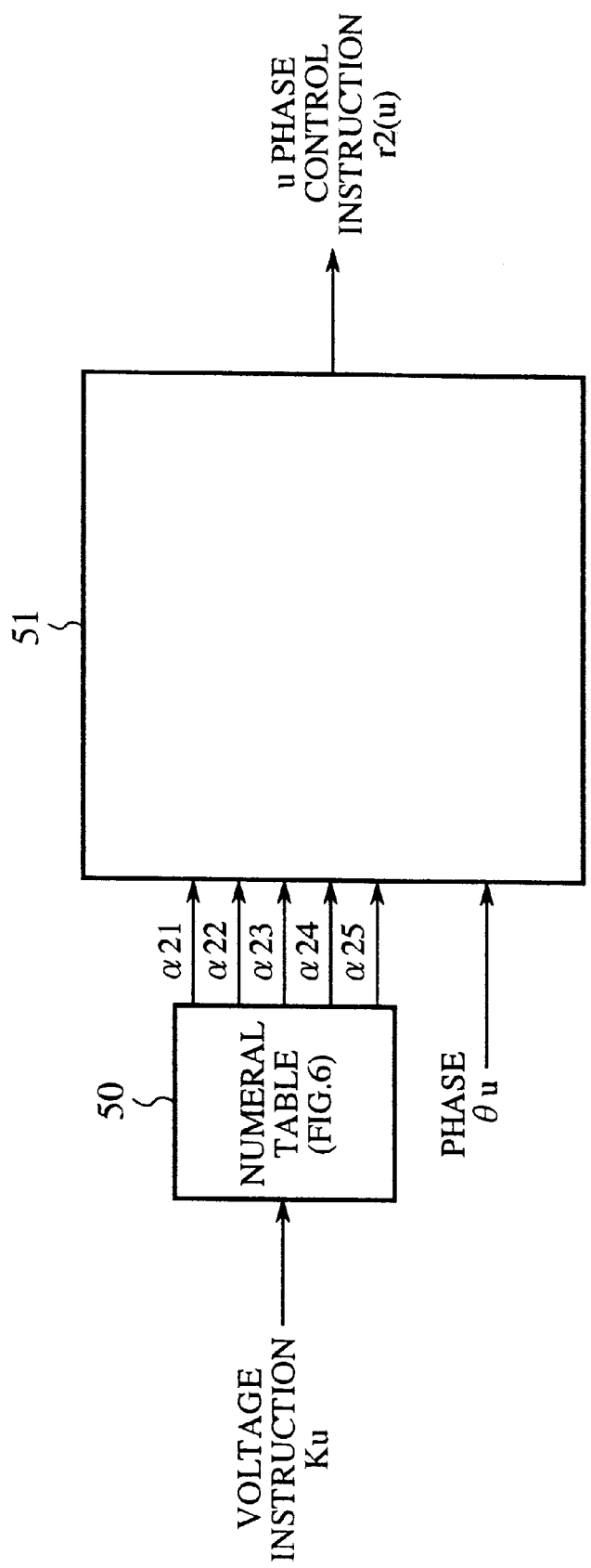
FIG. 26 shows a detailed structure of a modulator for the power conversion apparatus of FIG. 1.

FIG. 26 shows a detailed construction of the modulating circuit 17 of FIG. 1. The modulating circuit 17 comprises a numeral table 50 and an operation instruction unit 51. The procedure for control is the same as that of the modulating circuit 16 shown in FIG. 24. The numeral table 50 is as shown in FIG. 6. The other aspects of the operation of the modulating circuit 17 are essentially the same as those of the modulating circuit 16 so that the description thereof is omitted.

The power conversion units 14 and 15 controlled in accordance with different numeral tables as described above are connected to each other via the reactors 18 and 19. The voltage $V_{out}$ at the point of connection between the reactors 18 and 19 is an average voltage of the output voltages of the power conversion units 14 and 15.

The numerals in the numeral table 40 for controlling the power conversion unit 14 and the numeral table 50 for controlling the power conversion unit 15 are calculated and stored such that, given the same voltage instruction k (generically referring to the instructions $k_u$, $k_v$, and $k_w$), the third harmonics respectively occurring in the power conversion units 14 and 15 are of the same magnitude and 180° phase displaced. When an alternating current with a 180° phase displacement from the other alternating current is at a positive level, the other current is at an opposite negative level with the same absolute value. The magnitude of the third harmonic occurring in the power conversion unit 14 controlled in accordance with the numeral table 40 is as shown in FIG. 7. When the value designated by the instruction k is in the neighborhood of 1, the magnitude of the third harmonic is higher than $-0.1$ level. As the value approaches 0.7, the magnitude approaches $-0.3$ level, resulting in a 0.2 increase in the absolute value. In contrast, the magnitude of the third harmonic occurring in the power conversion unit 15 controlled in accordance with the numeral table 50 is as shown in FIG. 8. When the value designated by the instruction k is in the neighborhood of 1, the magnitude of the third harmonic is higher than 0.2 level. As the value approaches 0.7, the magnitude approaches 0.6 level. The magnitude of the third harmonic occurring at the point of connection between the reactors results from averaging the two voltages and varies with k as shown in FIG. 9. The magnitude of the third harmonic substantially remains at 0.1 level irrespective of the value of k. For example, the magnitude of the third harmonic is $(-0.05+0.26)/2=0.105$ when k=1 and $(-0.30+0.56)/2=0.13$ when k=0.7. Accordingly, by operating the two power conversion units using different PWM tables, an alternating output containing a third harmonic component at a reduced level is obtained.

As has been described, according to the first embodiment, the power conversion units 14 and 15 employing the PWM method designed to cancel harmonics of specific orders are connected in parallel with the ac power system. The power conversion units 14 and 15 supply phase voltages with mutually different waveforms to the ac power system 13. Therefore, even when there is a phase-to-phase imbalance between the output voltages of the power conversion units 14 and 15, a cross current having a frequency of the fundamental is prevented from flowing between the power conversion units 14 and 15 and harmonics including third and ninth harmonics are suppressed in the output voltage.

Figure 10:
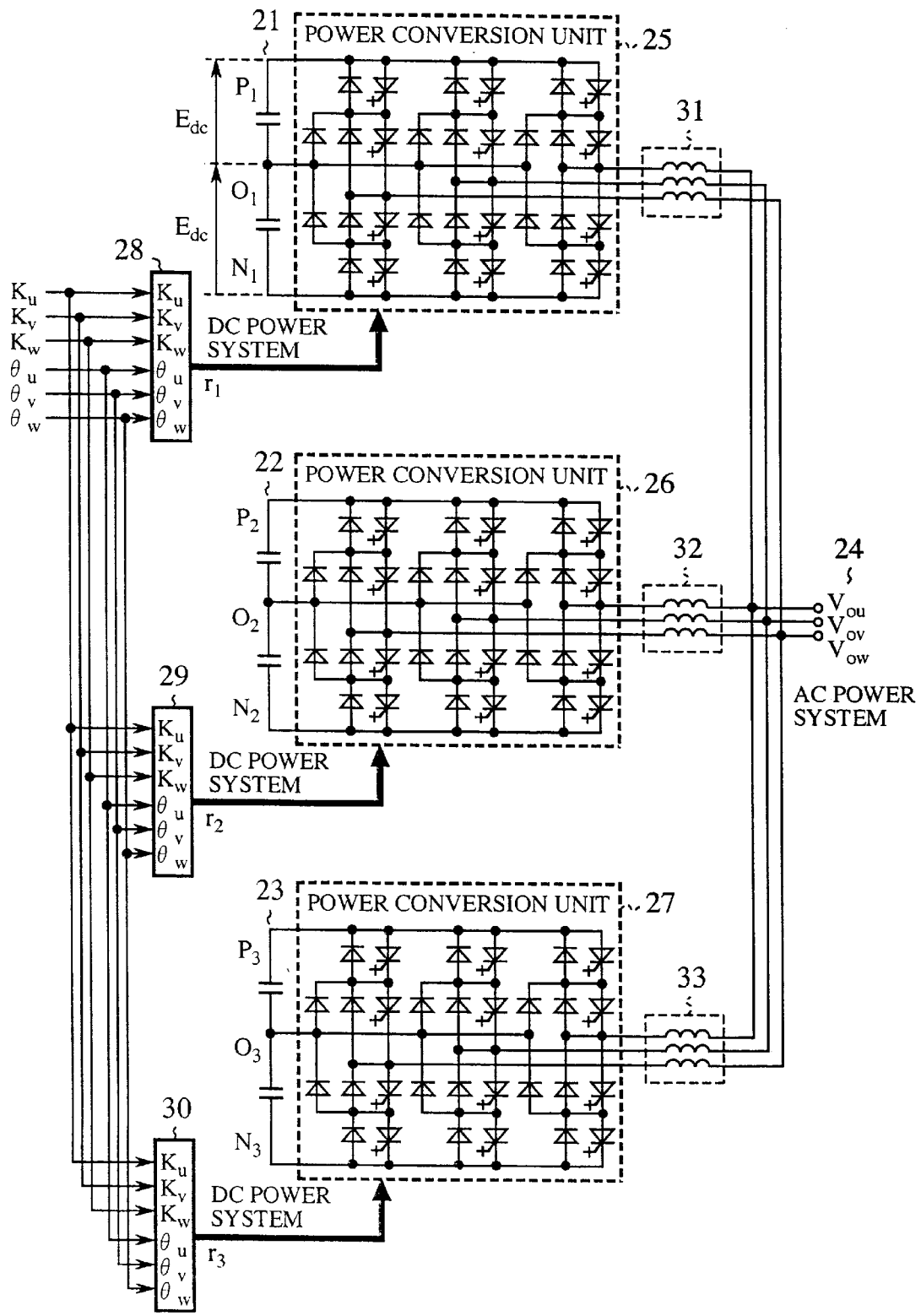
FIG. 10 shows a construction of a power conversion apparatus according to a second embodiment.

FIG. 10 shows a construction of a power conversion apparatus according to a second embodiment. Generally, a total of (n1+n2+n3+ . . . +nq) power conversion units adapted to output voltage waveforms Px (x=1, 2, . . . q) not including m1, m2, . . . mr harmonic components are used to construct the power conversion apparatus. In the example of FIG. 10, r=4, m1=5, m2=7, m3=11, m4=13, q=3, n1=1, n2=1 and n3=1. The voltage waveform Px comprises five pulses symmetrical about the horizontal axis. The power conversion apparatus uses three-phase, three-level, five-pulse inverters respectively adapted to cancel fifth, seventh, eleventh and thirteenth harmonics included in the output voltage comprising the five pulses. In the case of FIG. 10, the power conversion apparatus is formed as a triple-system power conversion apparatus.

Referring to FIG. 10, the power conversion apparatus comprises a dc power system in which a $P_1$-$O_1$ voltage and a $O_1$-$N_1$ voltage are equal to $E_{dc}$, a dc power system 22 in which a $P_2$-$O_2$ voltage and a $O_2$-$N_2$ voltage are equal to $E_{dc}$, a dc power system 23 in which a $P_3$-$O_3$ voltage and a $O_3$-$N_3$ voltage are equal to $E_{dc}$, a three-phase (u-phase, v-phase, w-phase) ac power system 24, power conversion units 25, 26 and 27 for dc to ac conversion based on the pulse width modulation adapted for elimination of harmonics of specific orders, using switching elements such as GTOs. The power conversion apparatus further comprises modulating circuits 28, 29 and 30 receiving a u-phase fundamental voltage amplitude instruction $k_u$, a v-phase fundamental voltage amplitude instruction $k_v$, and a w-phase fundamental voltage amplitude instruction $k_w$ and outputting operation signals r1, r2 and r3, which controls the output voltage of the power conversion units 25, 26 and 27, in response to a u-phase fundamental voltage phase instruction $\theta_u$, a v-phase fundamental voltage phase instruction $\theta_v$, and a w-phase fundamental voltage phase instruction $\theta_w$, and reactors 31, 32 ad 33 connecting in parallel the power conversion units 25, 26 and 27, respectively, to the ac power system 24.

Figure 11A:
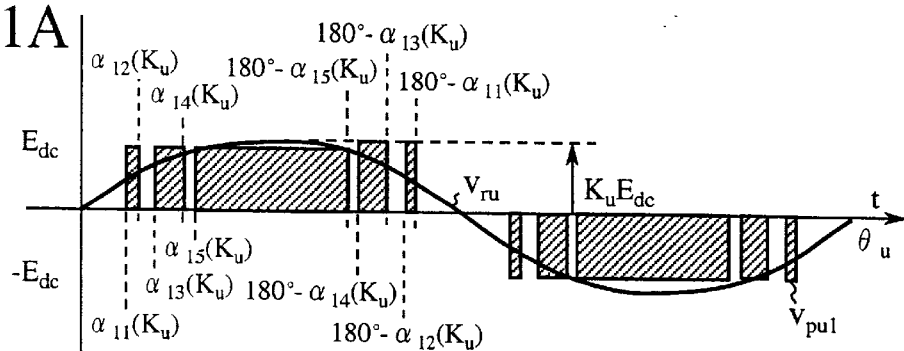
FIGS. 11A through 11C are graphs showing waveforms of voltages output by a power conversion unit 25.
Figure 11B:
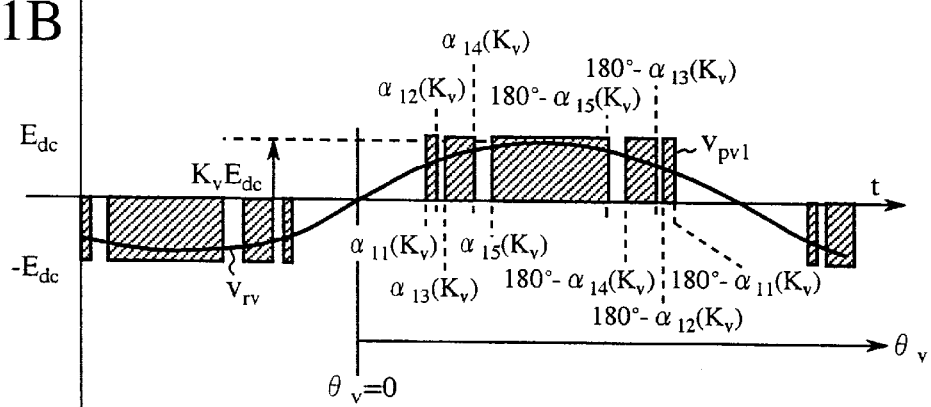
Figure 11C:
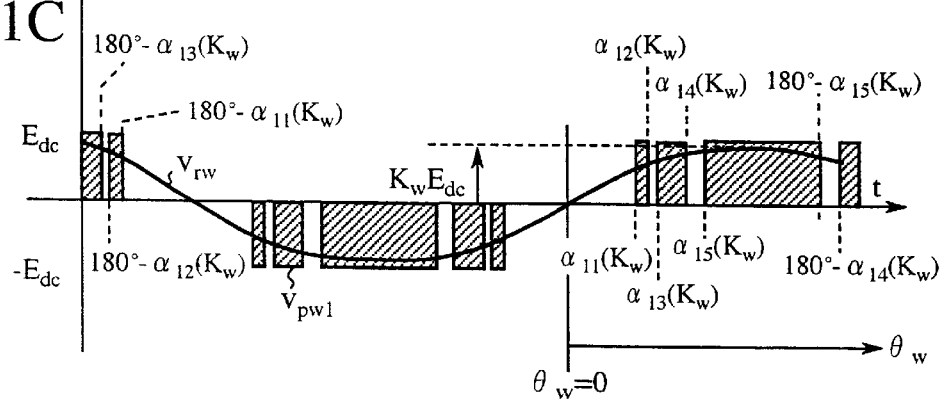

FIGS. 11A through 11C are graphs showing waveforms $V_{pu1}$, $V_{pv1}$ and $V_{pw1}$ of the u-phase voltage, v-phase voltage and w-phase voltage, respectively, output from the power conversion unit 25. $V_{ru}$, $V_{rv}$ and $V_{rw}$ each represents a sinusoidal waveform of the fundamental of the output voltage for each phase. The waveforms $V_{ru}$, $V_{rv}$ and $V_{rw}$ are mathematically represented as the equations (4), (5) and (6).

Figure 12:
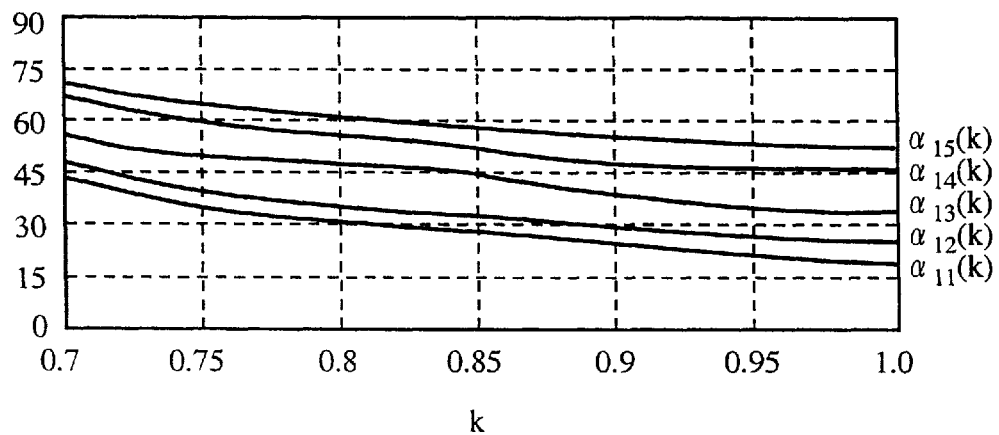
FIG. 12 shows a numeral table used to determine variables $\alpha_{11}$, $\alpha_{12}$, $\alpha_{13}$, $\alpha_{14}$ and $\alpha_{15}$ that define sinusoidal waveforms $V_{ru}$, $V_{rv}$ and $V_{rw}$.

FIG. 12 shows a numeral table used to determine variables $\alpha_{11}$, $\alpha_{12}$, $\alpha_{13}$, $\alpha_{14}$ and $\alpha_{15}$ that define sinusoidal waveforms $V_{ru}$, $V_{ru}$ and $V_{rv}$. Instructions $k_u$, $k_v$ and $k_w$ input to the modulating circuit 28 are plotted horizontally in the chart. Each of the variables $\alpha_{11}$–$\alpha_{15}$ varies in a range of 0 to 90 degrees and is plotted vertically in the chart. For each of the given instructions $k_u$, $k_v$ and $k_w$, a set of variables $\alpha_{11}$, $\alpha_{12}$, $\alpha_{13}$, $\alpha_{14}$ and $\alpha_{15}$ are determined.

Figure 13A:
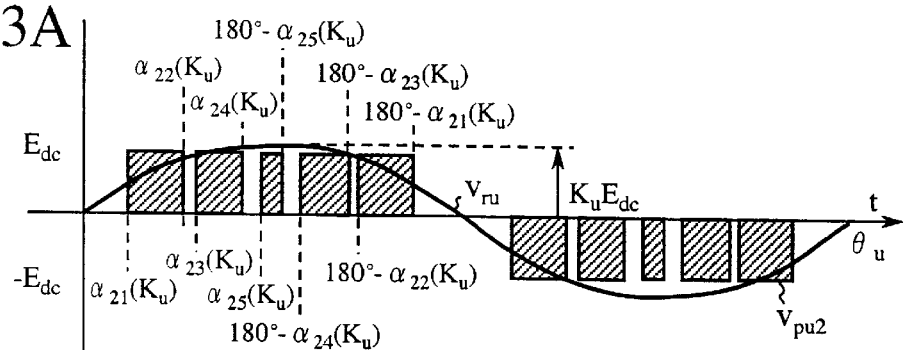
FIGS. 13A through 13C are graphs showing waveforms of voltages output by a power conversion unit 26.
Figure 13B:
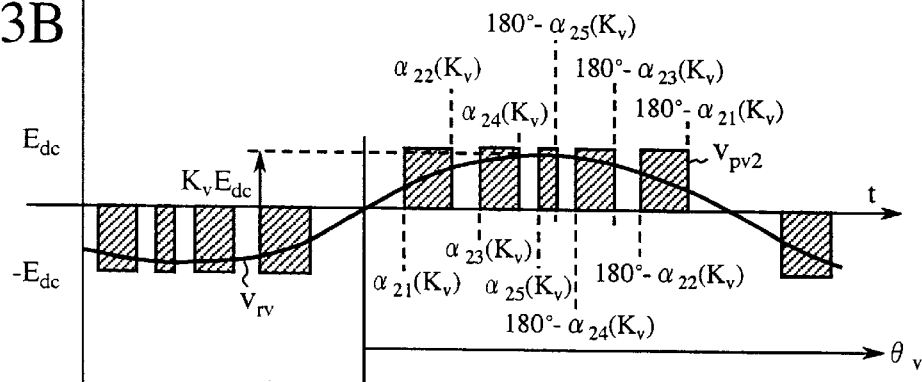
Figure 13C:
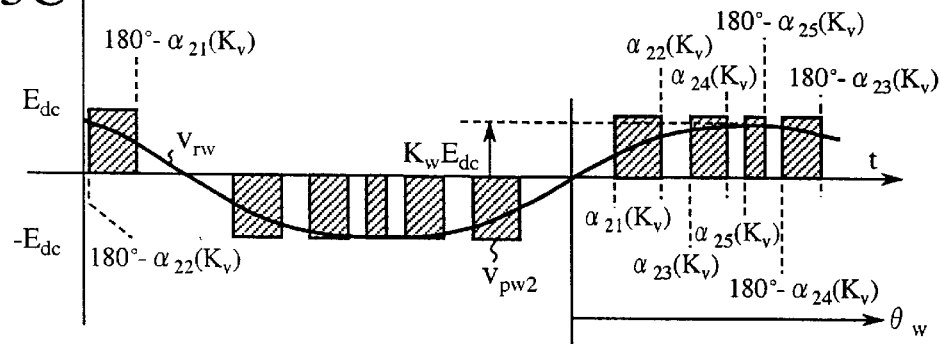

FIGS. 13A through 13C are graphs showing waveforms $V_{pu2}$, $V_{pv2}$ and $V_{pw2}$ of the u-phase voltage, v-phase voltage and w-phase voltage, respectively, output from the power conversion unit 26. $V_{ru}$, $V_{rv}$ and $V_{rw}$ each represents a sinusoidal waveform of the fundamental of the output voltage for each phase. The waveforms $V_{ru}$, $V_{rv}$ and $V_{rw}$ are mathematically represented as the equations (4), (5) and (6).

Figure 14:
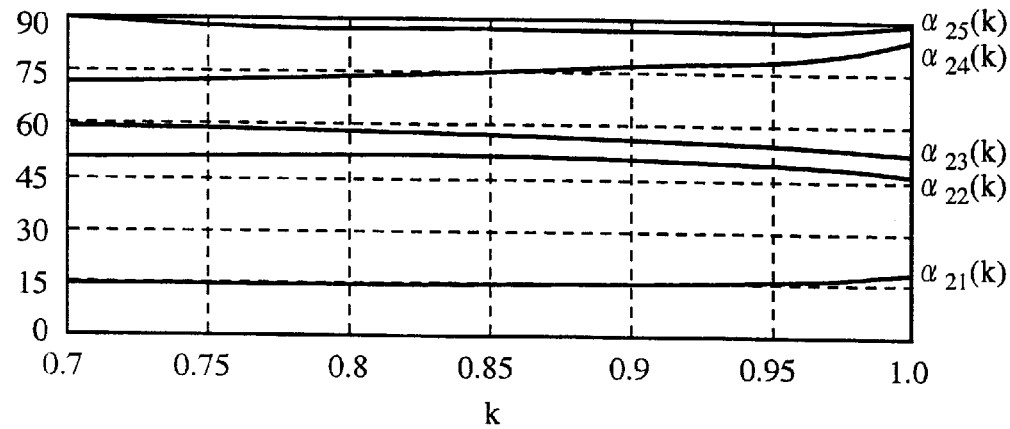
FIG. 14 shows a numeral table used to determine variables $\alpha_{21}$, $\alpha_{22}$, $\alpha_{23}$, $\alpha_{24}$ and $\alpha_{25}$ that define sinusoidal waveforms $V_{ru}$, $V_{rv}$ and $V_{rw}$.

FIG. 14 shows a numeral table used to determine variables $\alpha_{21}$, $\alpha_{22}$, $\alpha_{23}$, $\alpha_{24}$ and $\alpha_{25}$ that define sinusoidal waveforms $V_{ru}$, $V_{ru}$ and $V_{rw}$. Instructions $k_u$, $k_v$ and $k_w$ (generally represented as k) input to the modulating circuit 29 are plotted horizontally in the chart. Each of the variables $\alpha_{21}$–$\alpha_{25}$ varies in a range of 0 to 90 degrees and is plotted vertically in the chart. For each of the given instructions $k_u$, $k_v$ and $k_w$, a set of variables $\alpha_{21}$, $\alpha_{22}$, $\alpha_{23}$, $\alpha_{24}$ and $\alpha_{25}$ are determined.

Figure 15A:
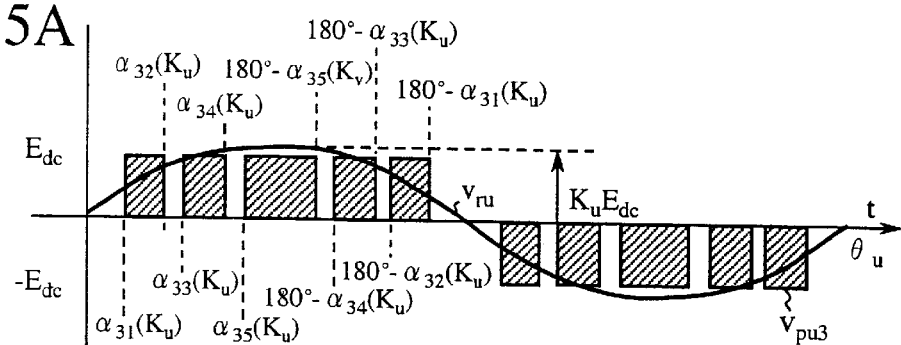
FIGS. 15A through 15C are graphs showing waveforms of voltages output by a power conversion unit 27.
Figure 15B:
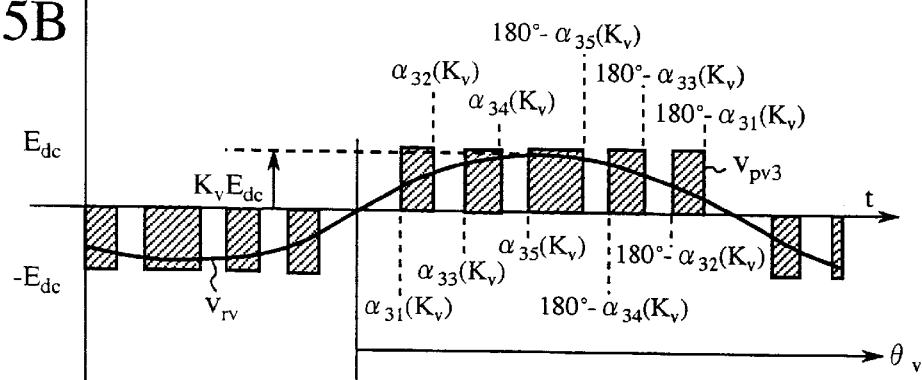
Figure 15C:
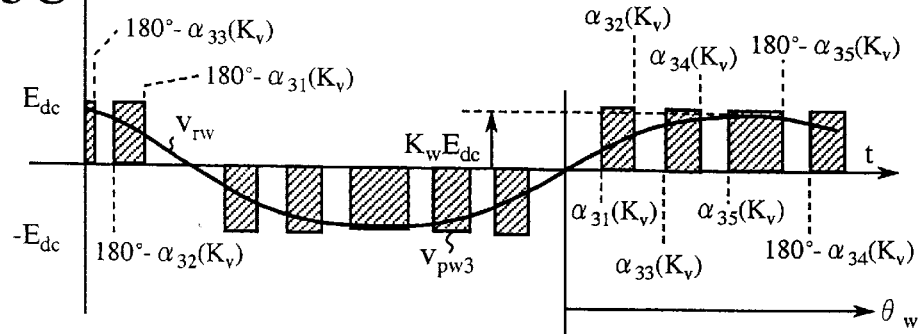

FIGS. 15A through 15C are graphs showing waveforms $V_{pu3}$, $V_{pv3}$ and $V_{pw3}$ of the u-phase voltage, v-phase voltage and w-phase voltage, respectively, output from the power conversion unit 27. $V_{ru}$, $V_{rv}$ and $V_{rw}$ each represents a sinusoidal waveform of the fundamental of the output voltage for each phase. The waveforms $V_{ru}$, $V_{rv}$ and $V_{rw}$ are mathematically represented as the equations (4), (5) and (6).

Figure 16:
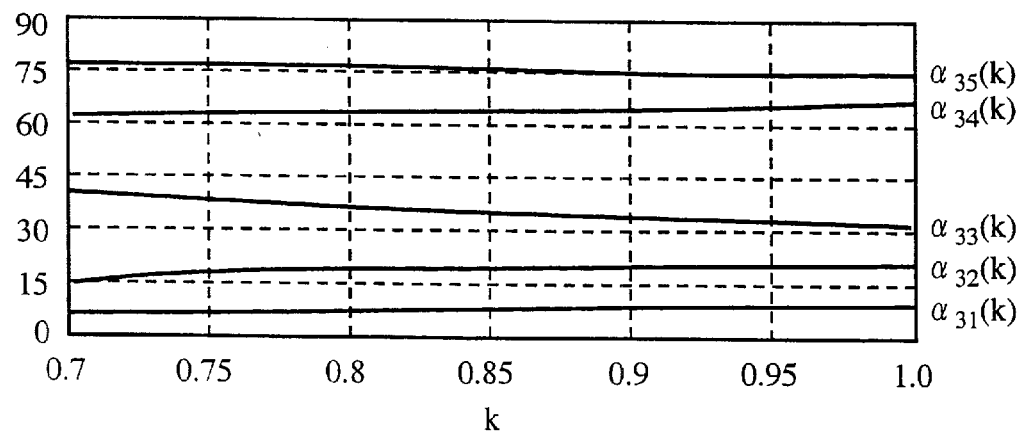
FIG. 16 shows a numeral table used to determine variables $\alpha_{31}$, $\alpha_{32}$, $\alpha_{33}$, $\alpha_{34}$ and $\alpha_{35}$ that define sinusoidal waveforms $V_{ru}$, $V_{rv}$ and $V_{rw}$.

FIG. 16 shows a numeral table used to determine variables $\alpha_{31}$, $\alpha_{32}$, $\alpha_{33}$, $\alpha_{34}$ and $\alpha_{35}$ that define sinusoidal waveforms $V_{ru}$, $V_{ru}$ and $V_{rw}$. Instructions $k_u$, $k_v$ and $k_w$ input to the modulating circuit 30 are plotted horizontally in the chart. Each of the variables $\alpha_{31}$–$\alpha_{35}$ varies in a range of 0 to 90 degrees and is plotted vertically in the chart. For each of the given instructions $k_u$, $k_v$ and $k_w$, a set of variables $\alpha_{31}$, $\alpha_{32}$, $\alpha_{33}$, $\alpha_{34}$ and $\alpha_{35}$ are determined.

Figure 17:
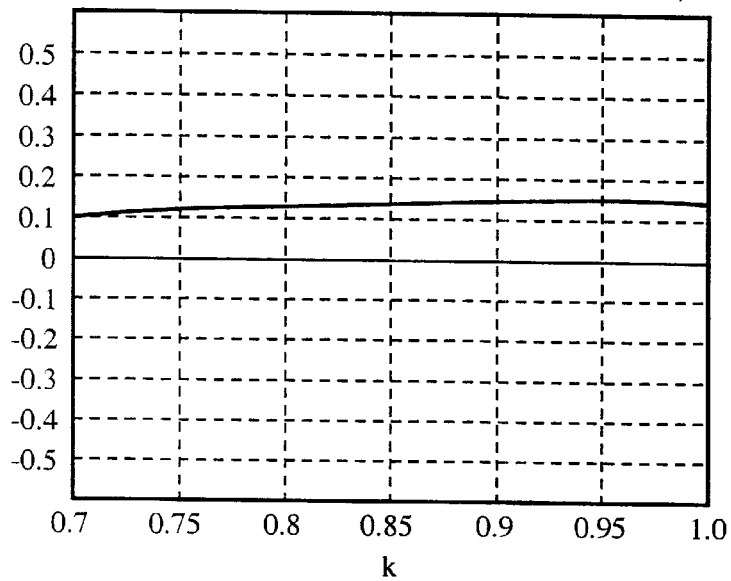
FIG. 17 is a graph showing an amplitude of a third harmonic included in a waveform of a voltage for one phase produced by a triple-system power conversion apparatus according to the second embodiment.

FIG. 17 is a graph showing an amplitude of third harmonic included in a waveform of a voltage for a phase produced by a triple-system power conversion apparatus according to the second embodiment. Instructions $k_u$, $k_v$ and $k_w$ input to the modulating circuits 28 through 30 are plotted horizontally in the graph. A relative amplitude of third harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$–1 is equal to 1.

Figure 18:
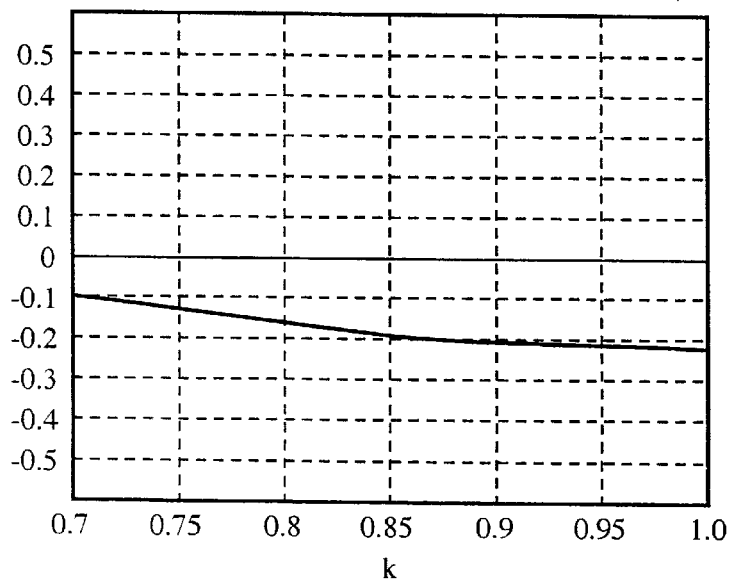
FIG. 18 is a graph showing an amplitude of a ninth harmonic included in a waveform of a voltage for one phase produced by a dual-system power conversion apparatus of FIG. 1.

FIG. 18 is a graph showing an amplitude of ninth harmonic included in a waveform of a voltage for a phase produced by a dual-system power conversion apparatus according to the first embodiment. Instructions $k_u$, $k_v$ and $k_w$ input to the modulating circuits 16 and 17 are plotted horizontally in the graph. A relative amplitude of ninth harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$=1 is equal to 1.

Figure 19:
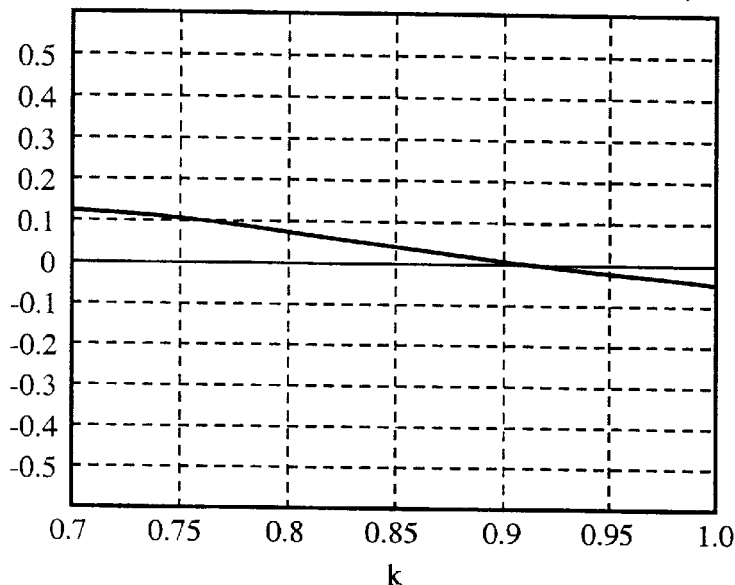
FIG. 19 is a graph showing an amplitude of a ninth harmonic included in a waveform of a voltage for one phase produced by a triple-system power conversion apparatus of FIG. 10.
Figure 20:
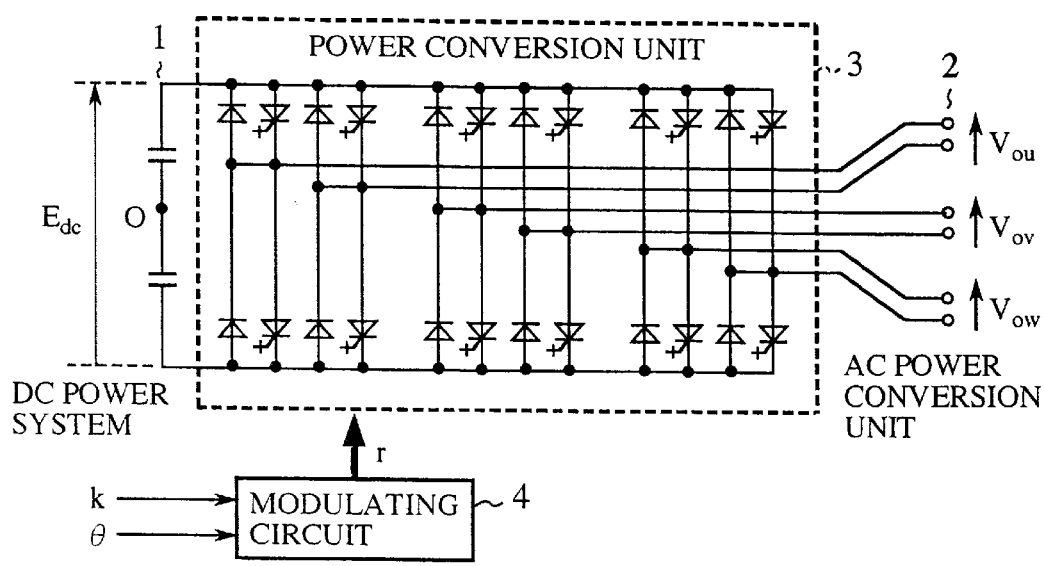
FIG. 20 shows a construction of an electric power conversion apparatus according to the related art.
Figure 21A:
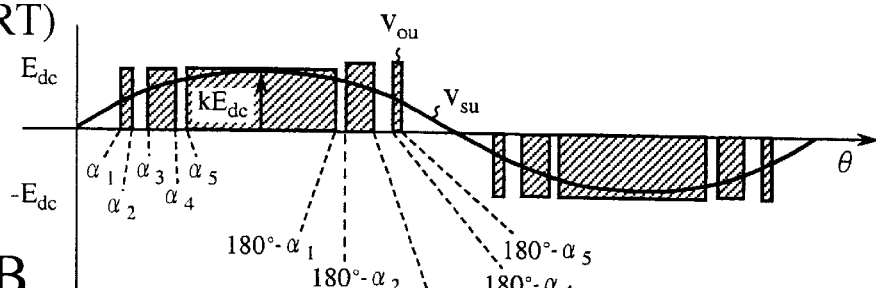
FIGS. 21A through 21C are graphs showing waveforms of voltages output by a power conversion unit according to the related art.
Figure 21B:
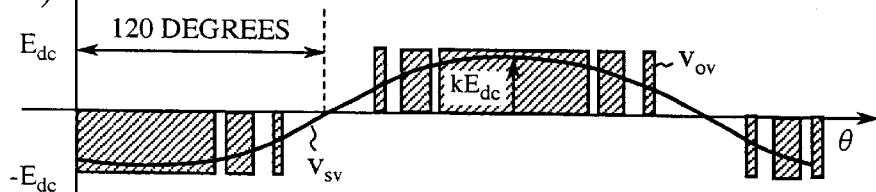
Figure 21C:
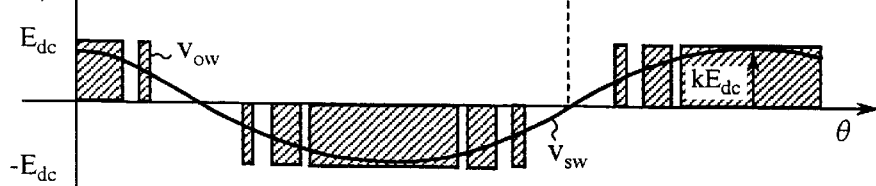
Figure 22:
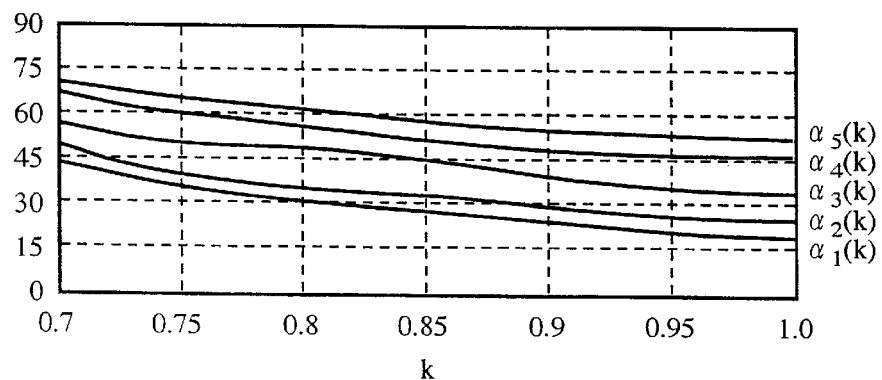
FIG. 22 shows a numeral table used to determine variables $\alpha_1$, $\alpha_2$, $\alpha_3$, $\alpha_4$ and $\alpha_5$ that define sinusoidal waveforms $V_{su}$, $V_{sv}$ and $V_{sw}$.
Figure 23:
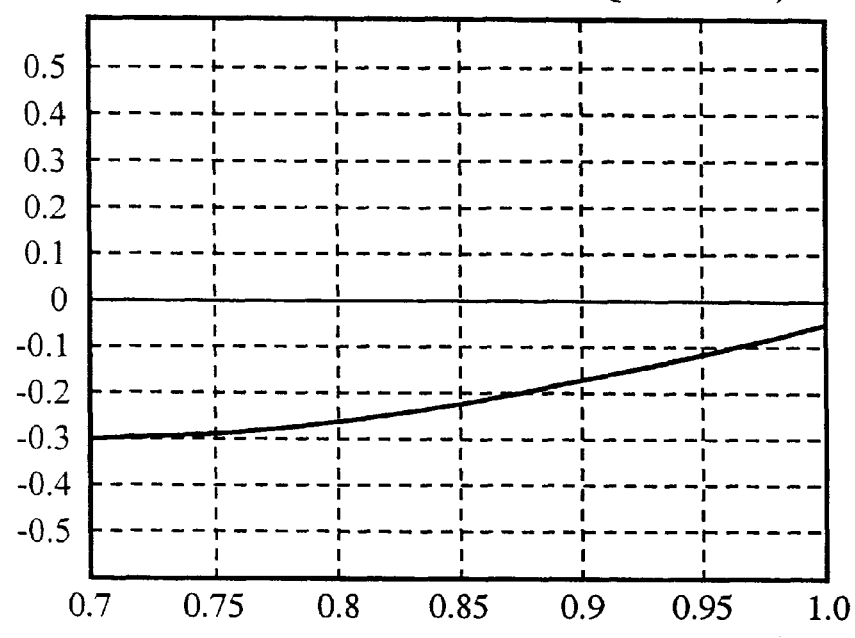
FIG. 23 is a graph showing an amplitude of a third harmonic included in a waveform of a voltage for one phase produced by a power conversion apparatus according to the related art.

FIG. 19 is a graph showing an amplitude of ninth harmonic included in a waveform of a voltage for a phase produced by a triple-system power conversion apparatus of FIG. 10. Instructions $k_u$, $k_v$ and $k_w$ input to the modulating circuits 28 through 30 are plotted horizontally in the graph. A relative amplitude of third harmonic component included in the voltage waveform for a phase with respect to the amplitude of fundamental is plotted vertically. In determining a ratio of the third harmonic component, it is assumed that the amplitude of fundamental when $k_u$, $k_v$, $k_w$=1 is equal to 1.

A description will now be given of the operation according to the second embodiment.

When the modulating circuit 28 receives the fundamental voltage amplitude instructions $k_u$, $k_v$, $k_w$ and the fundamental voltage phase instructions $\theta_u$, $\theta_v$ and $\theta_w$, the modulating circuit 28 outputs an operation signal r1 for ensuring that the fundamental components of the voltages for the respective phases output from the power conversion unit 25 have the respective waveforms $V_{ru}$, $V_{rv}$ and $V_{rw}$. In other words, the modulating circuit 28 outputs the operation signal r1 that causes the power conversion unit 25 to output the waveforms $V_{pu1}$, $V_{pv1}$ and $V_{pw1}$.

When the modulating circuit 29 receives the fundamental voltage amplitude instructions $k_u$, $k_v$, $k_w$ and the fundamental voltage phase instructions $\theta_u$, $\theta_v$ and $\theta_w$, the modulating circuit 29 outputs an operation signal r2 for ensuring that the fundamental components of the voltages for the respective phases output from the power conversion unit 26 have the respective waveforms $V_{ru}$, $V_{rv}$ and $V_{rw}$. In other words, the modulating circuit 29 outputs the operation signal r2 that causes the power conversion unit 26 to output the waveforms $V_{pu2}$, $V_{pv2}$ and $V_{pw2}$.

When the modulating circuit 30 receives the fundamental voltage amplitude instructions $k_u$, $k_v$, $k_w$ and the fundamental voltage phase instructions $\theta_u$, $\theta_v$ and $\theta_w$, the modulating circuit 30 outputs an operation signal r3 for ensuring that the fundamental components of the voltages for the respective phases output from the power conversion unit 27 have the respective waveforms $V_{ru}$, $V_{rv}$ and $V_{rw}$. In other words, the modulating circuit 30 outputs the operation signal r3 that causes the power conversion unit 27 to output the waveforms $V_{pu3}$, $V_{pv3}$ and $V_{pw3}$.

In response to the operation signal r1 from the modulating circuit 28, the power conversion unit 25 effects power conversion between the dc power system 21 and the ac power system 24, by driving the switching elements so that the u-phase output voltage, the v-phase output voltage and the w-phase output voltage have the waveforms $V_{pu1}$, $V_{pv1}$ and $V_{pw1}$, respectively.

In response to the operation signal r2 from the modulating circuit 29, the power conversion unit 26 effects power conversion between the dc power system 22 and the ac power system 24, by driving the switching elements so that the u-phase output voltage, the v-phase output voltage and the w-phase output voltage have the waveforms $V_{pu2}$, $V_{pv2}$ and $V_{pw2}$, respectively.

In response to the operation signal r3 from the modulating circuit 30, the power conversion unit 27 effects power conversion between the dc power system 23 and the ac power system 24, by driving the switching elements so that the u-phase output voltage, the v-phase output voltage and the w-phase output voltage have the waveforms $V_{pu3}$, $V_{pv3}$ and $V_{pw3}$, respectively.

As shown in FIGS. 11A, 11B and 11C, the voltage waveforms $V_{pu1}$, $V_{pv1}$ and $V_{pw1}$ are determined by the variables $\alpha_{11}$–$\alpha_{15}$. The variables $\alpha_{11}$–$\alpha_{15}$ are uniquely determined by the fundamental voltage amplitude instructions $k_u$, $k_v$, $k_w$. More specifically, the variables $\alpha_{11}$–$\alpha_{15}$ are determined by the modulating circuit 28 by referring to the numeral table of FIG. 12.

Each of the voltage waveforms $V_{pu1}$, $V_{pv1}$ and $V_{pw1}$ comprises five pulses symmetrical about the horizontal axis.

The fundamental components of the voltage waveforms $V_{pu1}$, $V_{pv1}$ and $V_{pw1}$ have the waveforms $V_{ru}$, $V_{rv}$ adn $V_{rw}$. The amplitude of fifth, seventh, eleventh and thirteenth harmonics is zero.

As shown in FIGS. 13A, 13B and 13C, the voltage waveforms $V_{pu2}$, $V_{pv1}$ and $V_{pw1}$ have the by the variables $\alpha_{21}$–$\alpha_{25}$. The variables $\alpha_{21}$–$\alpha_{25}$ are uniquely determined by the fundamental voltage amplitude instructions $k_u$, $k_v$, $k_w$. More specifically, the variables $\alpha_{21}$–$\alpha_{25}$ are determined by the modulating circuit 29 by referring to the numeral table of FIG. 14.

Each of the voltage waveforms $V_{pu2}$, $V_{pv2}$ and $V_{pw2}$ comprises five pulses symmetrical about the horizontal axis. The fundamental components of the voltage waveforms $V_{pu2}$, $V_{pv2}$ and $V_{pw2}$ have the waveforms $V_{ru}$, $V_{rv}$ and $V_{rw}$. The amplitude of fifth seventh, eleventh and thirteenth harmonics is zero.

As shown in FIGS. 15A, 15B and 15C, the voltage waveforms $V_{pu3}$, $V_{pv3}$ and $V_{pw3}$ are determined by the variables $\alpha_{31}$–$\alpha_{35}$. The variables $\alpha_{31}$–$\alpha_{35}$ are uniquely determined by the fundamental voltage amplitude instructions $k_u$, $k_v$, $k_w$. More specifically, the variables $\alpha_{31}$–$\alpha_{35}$ are determined by the modulating circuit 30 by referring to the numeral table of FIG. 16.

Each of the voltage waveforms $V_{pu3}$, $V_{pv3}$ and $V_{pw3}$ comprises five pulses symmetrical about the horizontal axis. The fundamental components of the voltage waveforms $V_{pu3}$, $V_{pv3}$ and $V_{pw3}$ have the waveforms $V_{ru}$, $V_{rv}$ and $V_{rw}$. The amplitude of fifth, seventh, eleventh and thirteenth harmonics is zero.

With this operation, it is ensured that the fifth, seventh, eleventh and thirteenth harmonics are eliminated from the voltage output from the power conversion units 25 through 27. The power conversion units 25 through 27 output fundamental components having a predetermined amplitude.

The output voltage of the triple-system power conversion apparatus is an average of the output voltage of the power conversion unit 25, the output voltage of the power conversion unit 26 and the output voltage of the power conversion unit 27. The fifth, seventh, eleventh and thirteenth harmonics are eliminated from the voltage output from the triple-system power conversion apparatus. Thus, the power conversion apparatus outputs a fundamental component having a predetermined amplitude.

Since the fundamental components of the power conversion units 25 through 27 are identical, a cross current having a frequency of a fundamental is prevented from flowing between the power conversion units 25 through 27.

When the output voltages are in a three-phase balanced state, that is, when the fundamental voltage amplitude instructions $k_u$, $k_v$, $k_w$ of the respective phases are identical, and when the fundamental voltage phase instructions $\theta_u$, $\theta_v$ and $\theta_w$ are displaced 120 degrees from each other, the line-to-line voltage cancels harmonics that are multiples of three so that these harmonics are not included in the output voltages.

When a minor imbalance between the output voltages of the respective phases is produced, elimination of third harmonics in the output voltage of the triple-system power conversion apparatus requires that the amplitude of third harmonic included in the output voltage of a phase is constant irrespective of the amplitude of the fundamental of the output voltages.

FIG. 17 shows that, in the triple-system power conversion apparatus, variation in the amplitude of third harmonic in the output voltage in relation to variation in the fundamental component in the output voltage is smaller than the corresponding variation in the power conversion apparatus using a singular power conversion unit employing the PWM method adapted for elimination of harmonics of specific orders. More specifically, in the triple-system power conversion apparatus, the amplitude of third harmonic in the output voltage occurring when imbalance in the three-phase system is produced is smaller than the corresponding amplitude in the power conversion apparatus using a singular power conversion unit employing the PWM method adapted for elimination of harmonics of specific orders.

Cancellation of ninth harmonic components will now be discussed. When the three-phase output voltages are balanced, ninth harmonic components are cancelled by the line-to-line voltage and are not included in the output voltage.

Like third harmonics, ninth harmonics show up in the output voltage when the three-phase output voltages are not balanced.

When the dual-system power conversion apparatus according to the first embodiment is used for the purpose of suppressing third harmonics when the three-phase output voltages are not balanced, for example, the amplitude of ninth harmonic for a phase in relation to the amplitude of fundamental for a phase is as shown in FIG. 18.

In contrast, when the triple-system according to the second embodiment is used, the amplitude of ninth harmonic for a phase in relation to the amplitude of fundamental for a phase is as shown in FIG. 19.

FIGS. 18 and 19 show that, in a range in which the value of the basic voltage amplitude instructions $k_u$, $k_v$, $k_w$ is equal to or larger than 0.73, the amplitude of ninth harmonic included in each phase of the triple-system power conversion apparatus is smaller than the corresponding amplitude of the dual-system power conversion apparatus according to the first embodiment.

Accordingly, by using the triple-system power conversion apparatus, third and ninth harmonics included in the output voltage are suppressed even when there is imbalance in the output voltages of the three-phase system.

Various advantages of the present invention will be summarized below.

According to the invention, a plurality of power conversion units each employing the pulse width modulation method adapted for elimination of harmonics of specific orders are connected to an ac power system. For each phase of the three-phase system, the plurality of power conversion units output mutually different voltages to the ac power system. Thus, even when the output voltages of the plurality of power conversion units are not balanced in the respective phases, a cross current having a frequency of a fundamental is prevented from flowing between the plurality of power conversion units. Third and ninth harmonics in the output voltage are suppressed.

In further accordance with the invention, a plurality of power conversion units are connected in parallel with an ac power system via reactors. Accordingly, third and ninth harmonic components in the output voltage are suppressed without requiring a complicated construction.

In further accordance with the invention, two power conversion units are connected in parallel so that third harmonic components in the output voltage are suppressed.

In further accordance with the invention, three power conversion units are connected in parallel so that ninth harmonic components in the output voltage are suppressed.

In further accordance with the invention, a power conversion apparatus comprises a plurality of power conversion units each employing the pulse width modulation method adapted for elimination of harmonics of specific orders. The power conversion units are connected to an ac power system so as to supply voltages of mutually different waveforms to the ac power system. Accordingly, even when there is imbalance between the voltages of the respective phases of the plurality of power conversion units, a cross current having a frequency of a fundamental component is prevented from flowing between the plurality of power conversion units. Third and ninth harmonics in the output voltage are thus suppressed.

The present invention is not limited to the above-described embodiments, and variations and modifications may be made without departing from the scope of the present invention.

What is claimed is:

1. A power conversion apparatus comprising:

two power conversion units, each power conversion unit producing multi-phase power, respective phases of each power conversion unit being connected in parallel via respective reactors and connected to a power system at a point of connection of the reactors, each of the two power conversion units being connected to a respective digitally-operated pulse width modulation apparatus, each digital pulse width modulation apparatus comprising:

a pulse pattern storage unit storing numeral tables mapping a voltage instruction to pulse duration; and an operation instruction unit determining a target pulse pattern by referring to said pulse pattern storage unit in accordance with the voltage instruction, and supplying an operation instruction signal corresponding to the target pulse pattern to the power conversion unit, wherein the pulse pattern is calculated such that fifth harmonics, seventh harmonics, eleventh harmonics, and thirteenth harmonics of a voltage at the point of connection of the reactors are substantially zero, and third harmonics present in respective output voltages of-the two power conversion units are substantially identical in magnitude and are phase-displaced by 180° from each other, and the third harmonics present in the voltage at the point of connection of the reactors is smaller in magnitude than the third harmonic in each of the two power conversion units.

2. The power conversion apparatus according to claim 1, wherein the pulse pattern includes information that requires switching five times in a half period of a fundamental wave.

3. A power conversation apparatus comprising:

three power conversion units, each power conversion unit producing multi-phase power, respective phases of each power conversion unit being connected in parallel via respective reactors and connected to a power system at a point of connection of the reactors, each of the three power conversion units being connected to a respective digitally-operated pulse width modulation apparatus, each digital pulse width modulation apparatus comprising:

a pulse pattern storage unit storing numeral tables mapping a voltage instruction to pulse duration; and an operation instruction unit determining a target pulse pattern by referring to said pulse pattern storage unit in accordance with the voltage instruction, and supplying an operation instruction signal corresponding to the target pulse pattern to the power conversion unit, wherein the pulse pattern is calculated such that fifth harmonics, seventh harmonics, eleventh harmonics, and thirteenth harmonics of a voltage at the point of connection of the reactors are substantially zero, and third harmonics present in respective output voltages of the three power conversion units are substantially identical in magnitude and are phase-displaced by 120° from each other, and the third harmonics present in the voltage at the point of connection of the reactors is smaller in magnitude than the third harmonics occurring in each of the three power conversion units.

4. The power conversion apparatus according to claim 3, wherein the pulse pattern includes information that requires switching five times in a half period of a fundamental wave.

* * * * *